United States Patent
Toyoda et al.

(10) Patent No.: US 11,281,940 B2
(45) Date of Patent: Mar. 22, 2022

(54) IMAGE FILE GENERATING DEVICE AND IMAGE FILE GENERATING METHOD

(71) Applicant: Olympus Corporation, Hachioji (JP)

(72) Inventors: Tetsuya Toyoda, Hachioji (JP); Masaru Ikeda, Fujimi (JP); Hideaki Yoshida, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 44 days.

(21) Appl. No.: 16/821,939

(22) Filed: Mar. 17, 2020

(65) Prior Publication Data

US 2020/0311474 A1 Oct. 1, 2020

(30) Foreign Application Priority Data

Mar. 27, 2019 (JP) .............................. JP2019-060849

(51) Int. Cl.
*G06K 9/62* (2022.01)
*G06F 3/04817* (2022.01)
*G06V 20/00* (2022.01)

(52) U.S. Cl.
CPC ....... *G06K 9/6256* (2013.01); *G06F 3/04817* (2013.01); *G06V 20/00* (2022.01); *G06V 2201/10* (2022.01)

(58) Field of Classification Search
CPC ............. G06K 9/6256; G06K 9/00624; G06K 2209/27; G06K 9/00664; G06F 3/04817
USPC ....................................................... 382/159
See application file for complete search history.

(56) References Cited

U.S. PATENT DOCUMENTS

| | | | |
|---|---|---|---|
| 2004/0054659 A1* | 3/2004 | McIntyre | G06T 11/60 |
| 2005/0027664 A1* | 2/2005 | Johnson | G06F 40/45 |
| | | | 706/12 |
| 2005/0152592 A1* | 7/2005 | Kasai | G06T 7/0012 |
| | | | 382/132 |
| 2006/0061595 A1* | 3/2006 | Goede | G06T 11/60 |
| | | | 345/619 |
| 2006/0082664 A1* | 4/2006 | Yoshida | G08B 13/19671 |
| | | | 348/239 |
| 2011/0157227 A1* | 6/2011 | Ptucha | H04N 5/23293 |
| | | | 345/638 |
| 2015/0178920 A1* | 6/2015 | Garnavi | G16H 15/00 |
| | | | 600/476 |
| 2017/0339462 A1* | 11/2017 | Clarke | G06F 16/433 |
| 2018/0225519 A1* | 8/2018 | Chen | G06K 9/4628 |
| 2018/0373738 A1 | 12/2018 | Mitarai | |
| 2019/0230129 A1* | 7/2019 | Digiambattista | H04L 63/20 |
| 2020/0265247 A1* | 8/2020 | Musk | G06K 9/6289 |

* cited by examiner

*Primary Examiner* — Stephen P Coleman
(74) *Attorney, Agent, or Firm* — John C. Pokotylo; Pokotylo Patent Services

(57) ABSTRACT

An image file generating device, comprising a processor having an image input section and a file generation section, the image input section inputting image data that has been converted based on images, wherein the file generating section attaches annotation related information to the image data as metadata for a relationship between the image data and user's concern, and makes into a file as training data, wherein the annotation related information includes information that has been selected from within at least one of (1) information as to whether what is being determined is an event or not, and (2) information as to whether what is being determined is timing or not.

2 Claims, 10 Drawing Sheets

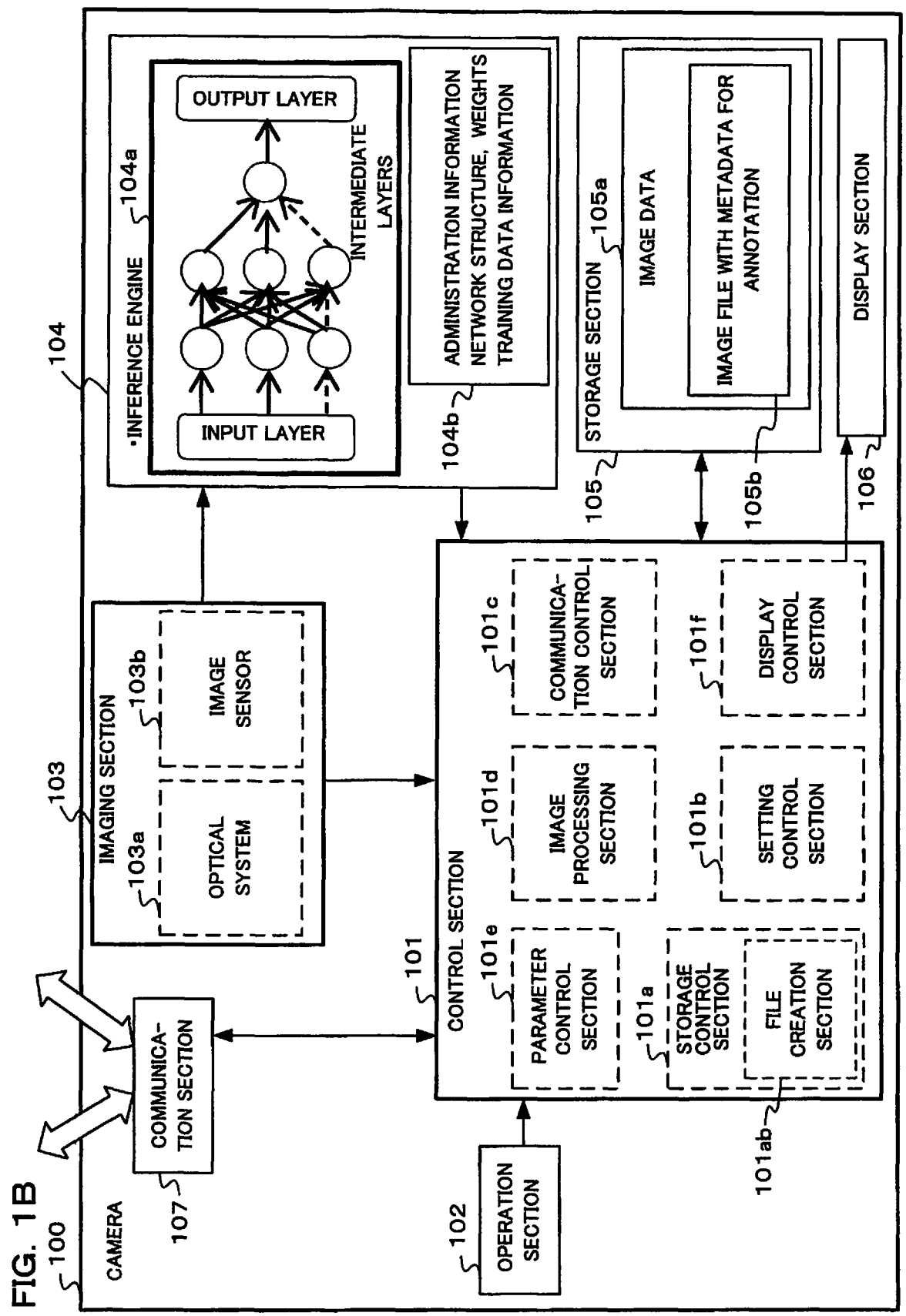

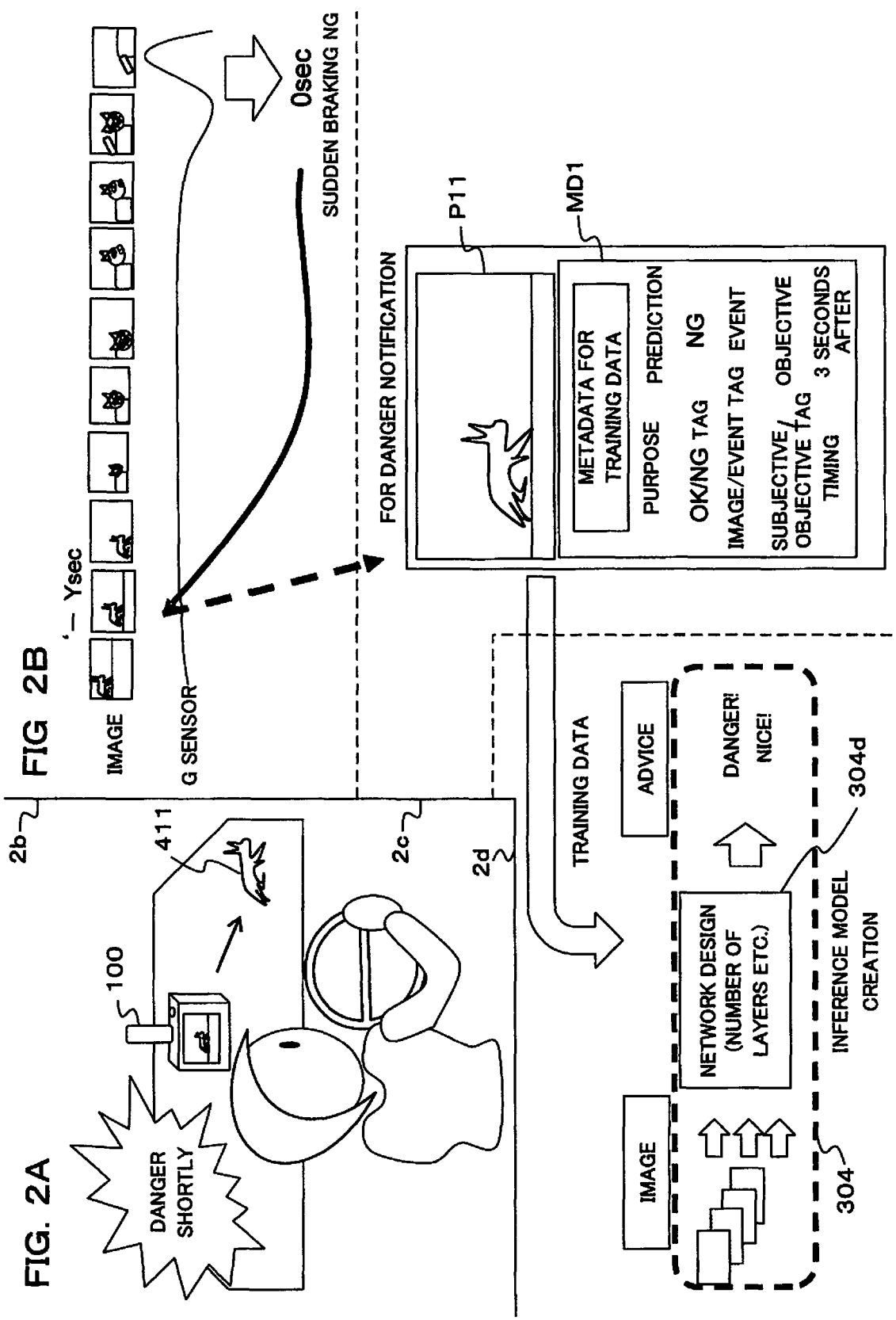

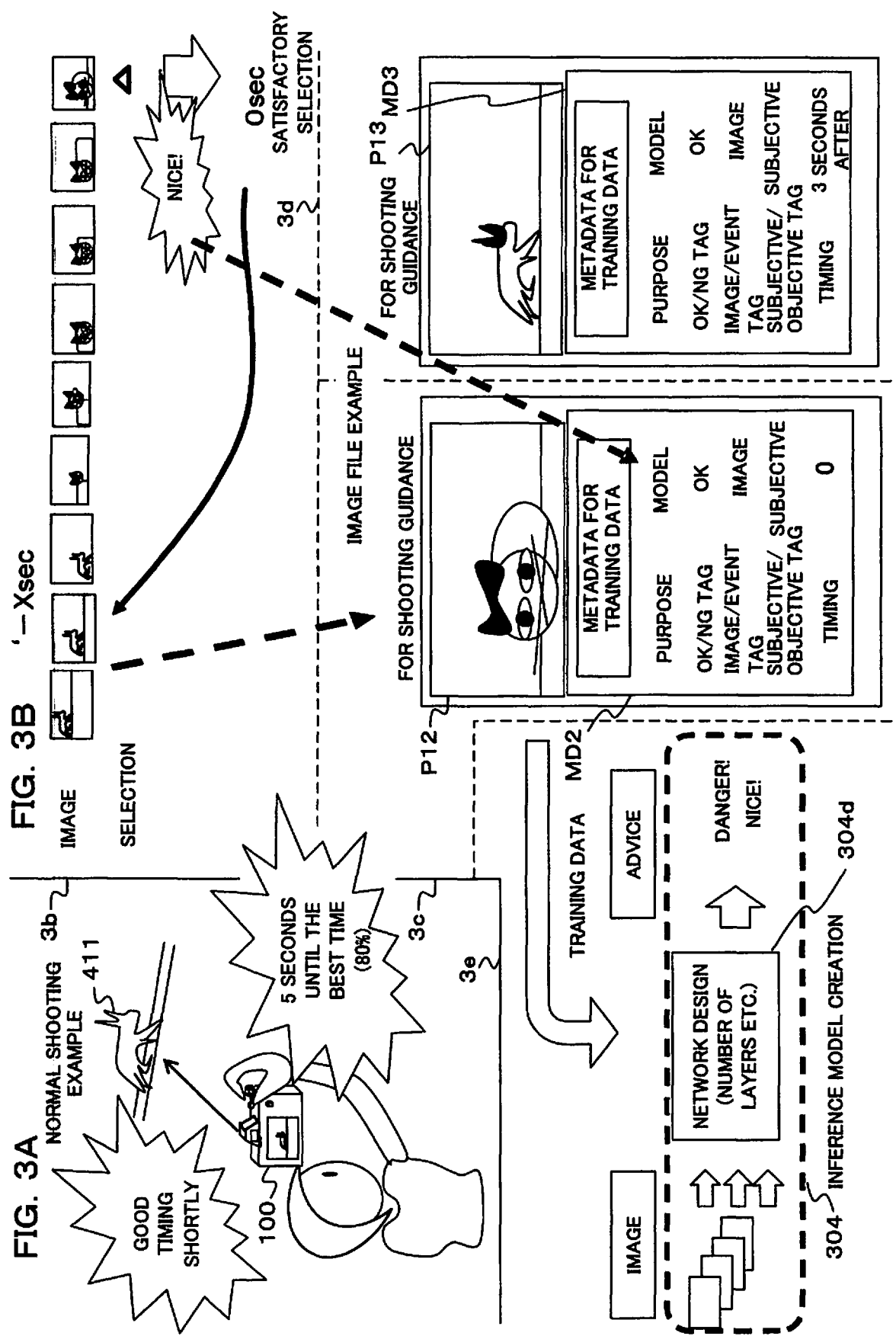

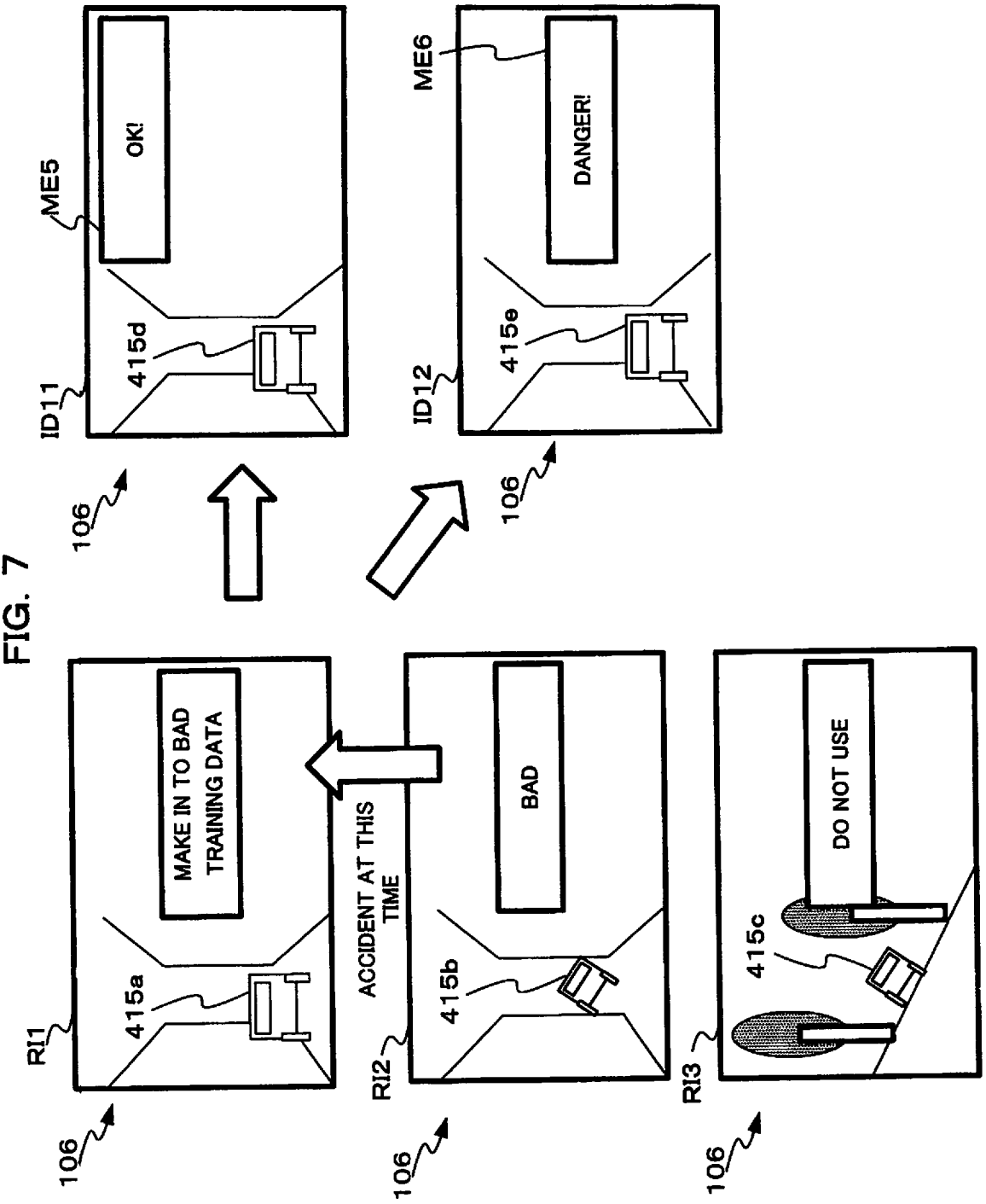

IMAGE FILE GENERATING DEVICE AND IMAGE FILE GENERATING METHOD

CROSS-REFERENCE TO RELATED APPLICATIONS

Benefit is claimed, under 35 U.S.C. § 119, to the filing date of prior Japanese Patent Application No. 2019-060849 filed on Mar. 27, 2019. This application is expressly incorporated herein by reference. The scope of the present invention is not limited to any requirements of the specific embodiments described in the application.

BACKGROUND OF THE INVENTION

1. Field of the Invention

The present invention relates to an image file generating device and an image file generating method for generating an image file used at the time of requesting generation of an inference model to a machine learning device for deep learning etc.

2. Description of the Related Art

An information provision method is known whereby various information is accumulated, and in a case where an abnormal situation arises based on this information associated information is retrieved from within the accumulated information, so as to deal with the abnormal situation on the basis of this associated information. For example, an information provision device that acquires monitoring information that indicates state of a monitored object, stores this monitoring information in a storage section, and detects occurrence of an event that constitutes a trigger for information provision based on the monitoring information that has been stored in the storage section, is proposed in Japanese patent laid-open No. 2017-107509 (hereafter referred to as "patent publication 1"). If an event is detected, this information provision device retrieves associated information that has been associated with this event and performs provision of information based on associated information. With this information provision device, if an event such as an abnormality has occurred, it is possible to automatically provide information that has a high possibility of being able to handle that event. Also, in recent years it has been proposed to generate an inference model by performing deep learning using training data, and to perform inference on input images using this inference model.

With patent publication 1 described above it is possible to present a solution when the fact that a problem has occurred has been detected based on monitoring images. However, it is only possible to present countermeasures for information that has been stored in a storage section. In order to solve this, if inference using an inference model is utilized, it would become possible to handle various problems flexibly. However, generating an inference model that is in accordance with a user's intention has not been easy.

SUMMARY OF THE INVENTION

The present invention provides on image file generating device and image file generating method that are capable of generating training data that is effective at the time of generating an inference model such as can answer a user's concerns.

An image file generating device of a first aspect of the present invention comprises a processor having an image input section and a file generation section, wherein the image input section inputs image data that has been converted based on an image, and the file generating section attaches annotation related information to the image data as metadata for a relationship between the image data and user's concern, and makes into a file as training data by attaching the annotation related information to the image data as metadata, wherein the annotation related information includes information that has been selected from among at least one of (1) information as to whether what is being determined is an event or not, (2) information as to whether what is being determined is timing or not.

An image file generating method of a second aspect of the present invention comprises inputting image data that has been converted based on images, and inputting information, that has been selectively organized so that it is possible to output concerns that relate to the user's input images (or that are expected in inference that used the input images) as inference results), as annotation related information corresponding to the image data, attaches the annotation related information to the image data as metadata, and makes into a file as training data, wherein the annotation related information includes information that has been selected from among at least one of (1) information as to whether what is being determined is an image or an event, and (2) information on whether a judgment time is at the time of shooting or at another time.

An image file generating method of a third aspect of the present invention comprises inputting image data that has been converted based on images, inputting information that has been organized as items as annotation related information corresponding to the image data in order for classified user's concerns to be output as inference results, and generating integrated data, in which the annotation related information has been attached to the image data as metadata, as a block for blockchain management.

BRIEF DESCRIPTION OF THE DRAWINGS

FIG. 1A and FIG. 1B are block diagrams mainly showing the electrical structure of an image file generating system of one embodiment of the present invention.

FIG. 2A and FIG. 2B are drawings showing examples of images, and inference of relationships of events that occur from those images, in a learning system of one embodiment of the present invention.

FIG. 3A and FIG. 3B are drawings showing examples of images, and inference of shooting opportunities from relationships between those images and events that will occur, in a learning system of one embodiment of the present invention.

FIG. 7 is a drawing showing appearance of evaluating a user's actions, in a learning system of one embodiment of the present invention.

DETAILED DESCRIPTION OF THE PREFERRED EMBODIMENTS

When a user wants to utilize an inference model for specific concerns, needs such as a desire to acquire some information increase for specific visual scenes. A need has therefor arisen to generate training data simply while the user is looking at images. However, in order to generate an inference model that is in accordance with an individual user's intentions, specific standardization and simplification have to be performed, otherwise the operation becomes complicated. By implementing a scheme, such as an example shown in one embodiment of the present invention below, it becomes possible to simply generate an inference model that can answer various concerns of individual users in respective scenes.

In the following, description will be given of an image file generation system that comprises a camera, a learning section, and an image file generation section, as one embodiment of the present invention. An overview of this embodiment is as follows. A camera has an imaging section, the imaging section converts images to image data, and a display section displays Quickview images for confirmation after shooting, based on image data. At the time of image display, icons representing information relating to concerns the user has for this image (for example, with the example shown in FIG. 4, "good training", "bad training") are displayed. If the user selects an icon in accordance with determination results about an image, an image file with metadata for annotation is generated based on this icon that has been selected. Obviously, there may also be a specification that can input level (for example, of good or bad items), such as notable points within items, axes within items, or feature designations within items, and directivity and weight within items, etc., not by input of an alternative within items that have been displayed using icons.

Figure 1A:
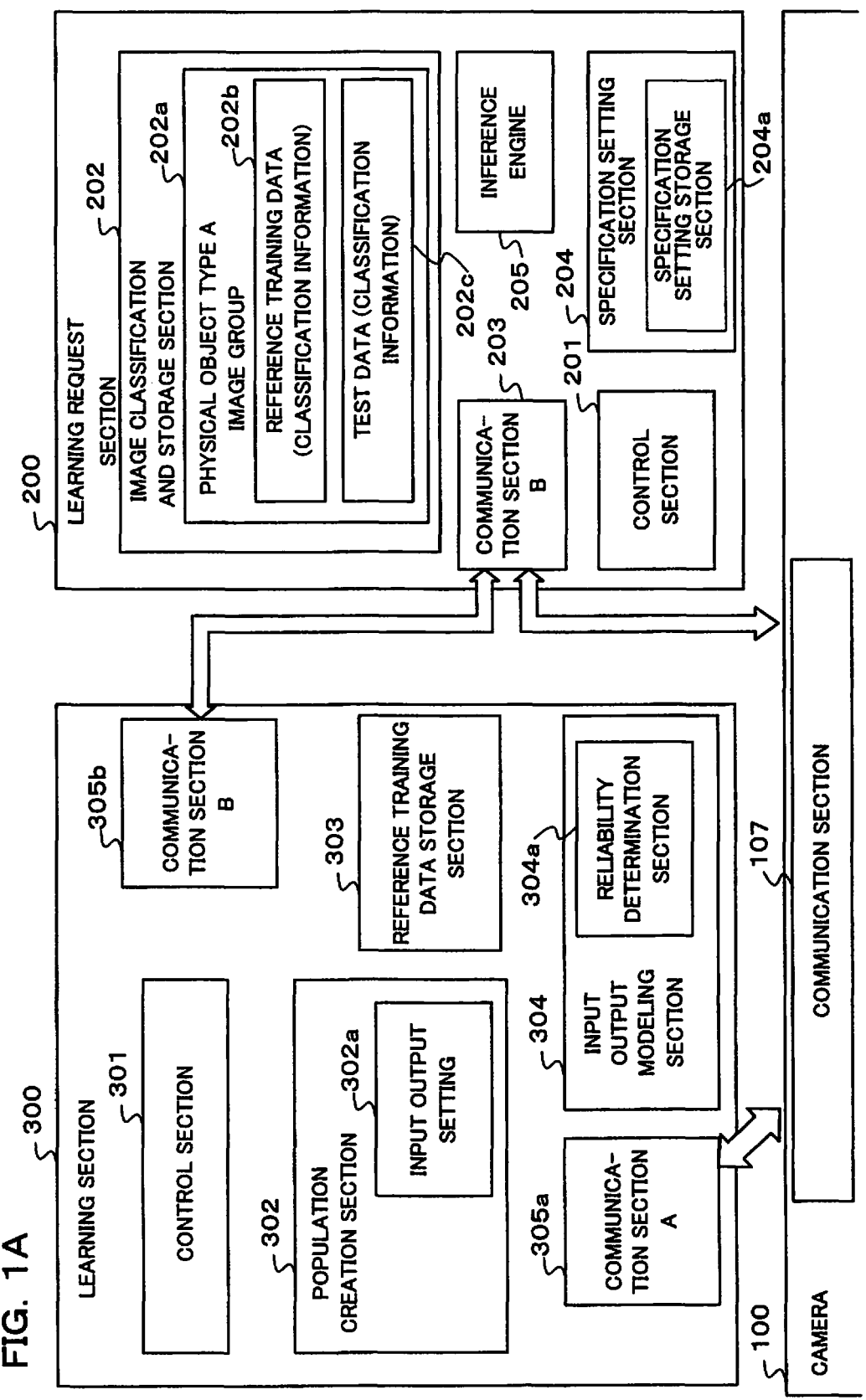

FIG. 1A and FIG. 1B are block diagrams showing the whole of an image file generating system of one embodiment of this embodiment. This image file generation system comprises a camera 100, an image file generation section 200 and a learning section 300.

The camera 100 is a so-called digital camera, and in summary has an imaging section 103, with a subject image being converted to image data by this imaging section 103, and the subject image being subjected to live view display on a display section 106 arranged on the rear surface of the camera body based on this converted image data. A photographer determines composition and photo opportunity by looking at the live view display. At the time of an instruction operation for actual shooting, image data is stored in a storage section 105. Image data that has been stored in the storage section 105 can be subjected to playback display on the display section 106 if playback mode is selected.

Detailed structure of the camera 100 shown in FIG. 1B will be described. The camera 100 comprises a control section 101, operating section 102, imaging section 103, inference engine 104, storage section 105, display section 106 and communication section 107.

The operating section 102 is an input interface for a user to issue various instructions to the camera. The operating section 102 has operation members for various input, such as a release button, various switches such as a power supply switch, various dials such as a mode setting dial for shooting mode setting, and a touch panel that is capable of touch operations etc. Operating states of operation members that have been detected by the operating section 102 are output to the control section 101. It is possible to select icons C1 to IC3, IC11 to IC13 that are displayed on the display section 106, that will be described later, using the operation section 102 (including a touch panel) (refer to FIG. 4 to FIG. 6). The operating section 102 functions as an input interface (selection section) for selecting icons.

The imaging section 103 has an optical system 103a and an image sensor 103b. The optical system 103a is an optical lens for forming an optical image of the subject, which is a photographed object, and has a focus lens and a zoom lens etc. The image sensor 103b subjects the optical image to photoelectric conversion and outputs an image signal. Besides this, the imaging section 103 comprises various circuits and elements such as an imaging control circuit, image signal processing circuit, aperture, and shutter etc. The image signal is converted to digital image data by the image signal processing circuit, and output to the control section 101, inference engine 104 etc. The imaging section 103 functions as an imaging section that converts an image to image data and outputs the image data (refer to S3 in FIG. 8A). The imaging section 103 functions as an imaging section (image input interface) that images image data that has been converted based on an image.

The inference engine 104 stores inference models, and performs inference for image data that has been input from the imaging section 103 using inference models that have been stored. Inference models that have been generated by the learning section 300, which will be described later, are input by means of the communication section 107, and stored. The inference engine 104 has network design 104a and administration information 104b.

The network design 104a has intermediate layers (neurons) arranged between an input layer and an output layer. Image data that has been acquired by the imaging section 103 is input to the input layer. A number of layers of neurons are arranged as intermediate layers. The number of neuron layers is appropriately determined according to the design, and a number of neurons in each layer is also determined appropriately in accordance with the design. Intermediate layers N are subjected to weighting based on an inference model that has been generated by the learning section 300. Image evaluation information is output at the output layer in accordance with images that have been input to the input layer. Deep learning will be described together with description of an input output modeling section 304.

The administration information 104b is information that has been stored in memory within the inference engine 104. The administration information 104b includes network structure, weights, and training data information. Among these items, the network structure is information for stipulating the structure of neurons of the network design 104a. Weights are information relating to weighting of connections between neurons. Training data information is information relating to training data, such as training data creator, version information, and information relating to a data population that created the training data. These items of administration information 104b, as well as being stored in memory within the inference engine 104, may also be stored in other memory within the camera 100.

The storage section 105 is an electrically rewritable non-volatile memory. Image data 105a, that has been output from the imaging section 103 and subjected to image processing for storage by an image processing section 101d, is stored in the storage section 105. This image data 105a is read out, and after having been subjected to image processing for playback display by the image processing section 101*d* is subjected to playback display on the display section 106.

Also, the storage section 105 has an image file 105*b* with metadata for annotation, in part of a storage region of the image data 105*a*. The image file 105*b* with metadata for annotation is training data that will be used at the time of deep learning, as will be described later. Specifically, when shooting has been performed, the user performs annotation on image data in order to use as training data, as will be described later using FIG. 2A to FIG. 8. The image file 105*b* with metadata for annotation is image data that has this annotation.

Also, the storage section 105 not only stores images, but may also store various programs and parameters etc., and may store information on "format for requesting machine learning". This information is a function for requesting learning to the learning request section 200, and may also be stored so as to be able to cooperate with the learning request section 200 etc. For example, the learning request section 200 may cooperate with a display control section 101*f* so that it is easy for the user to perform setting such that images that have been received from the camera 100 constitute training data for an inference model for the purpose intended by the user. As a display example, list display may be performed such as for the tag items shown in FIG. 2A and FIG. 2B, and in FIG. 3A and FIG. 3B, and item display may be performed such as shown in FIG. 4 to FIG. 7.

Also, in the example shown in FIG. 2A, FIG. 2B, FIG. 3A, FIG. 3B, and FIG. 7, which will be described later, there are cases where annotation related information is formed based on results that are dependent on the passage of time, for example, based on an event such as a cat suddenly jumping out, expression and composition of a cat becoming good, or a vehicle having an accident. An image file with metadata for annotation that includes this type of information is created by a file creation section 101*ab*, and is stored as an image file 105*b* with metadata for annotation. The storage section 105 functions as a memory (storage section) for storing information indicating passage of time in association with image data that is output from the imaging section.

The display section 106 has a display such as an LCD monitor organic EL, and is arranged on a rear surface or the like on the outside of the camera 100, or is an electronic viewfinder (EVF) that is capable of being observed through an eyepiece. A live view image that is based on an image that has been acquired using the imaging section 103 is displayed on the display section 106, and taken images are displayed over a predetermined time for confirmation of taking images after shooting (also called Quickview). Also, images that have been stored in the storage section 105 are subjected to playback display on the display section 106, and inference results from the inference engine 104 are displayed.

Figure 4:
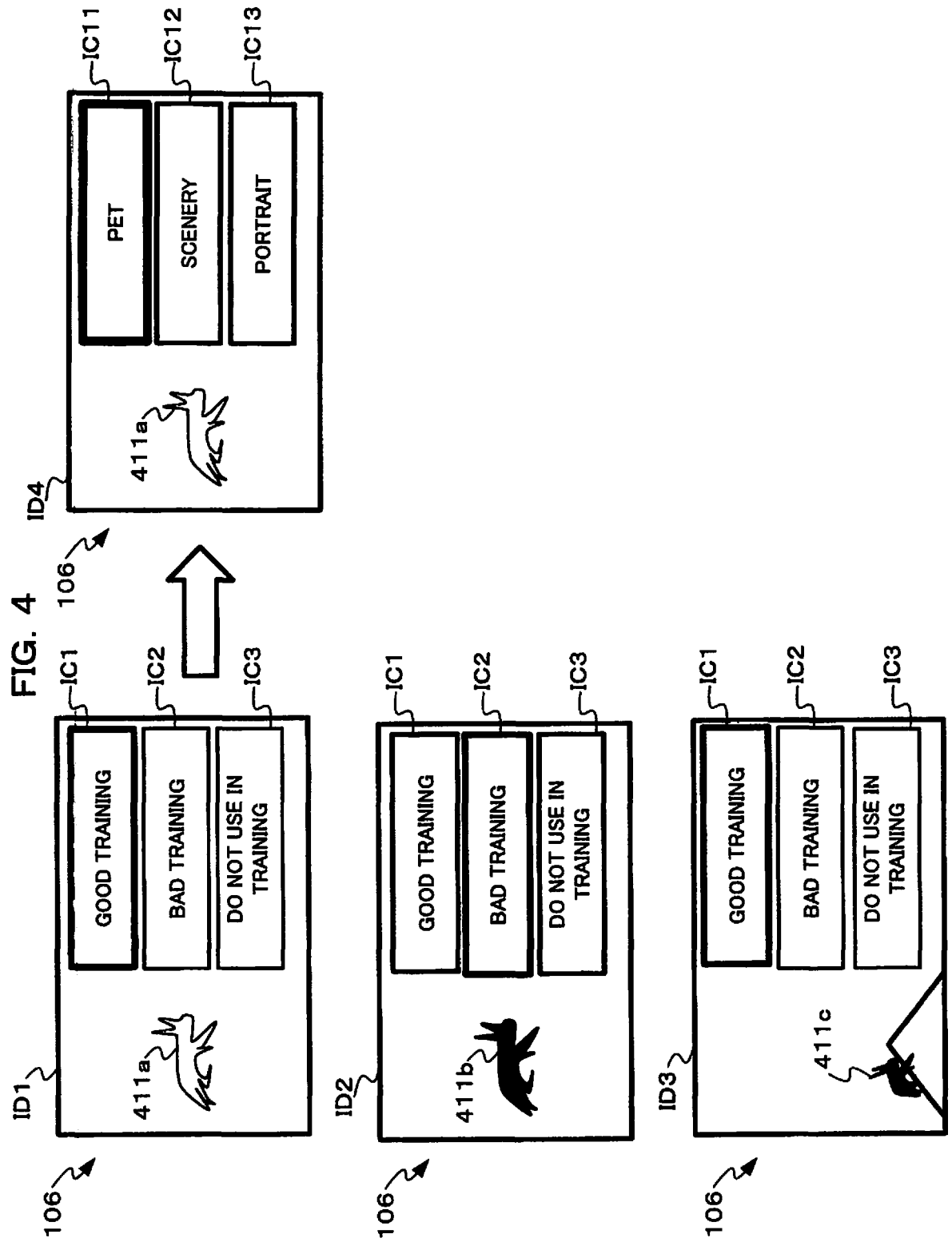
FIG. 4 is a drawing showing appearance of a user evaluating images at the time of Quickview display, in a learning system of one embodiment of the present invention.
Figure 5:
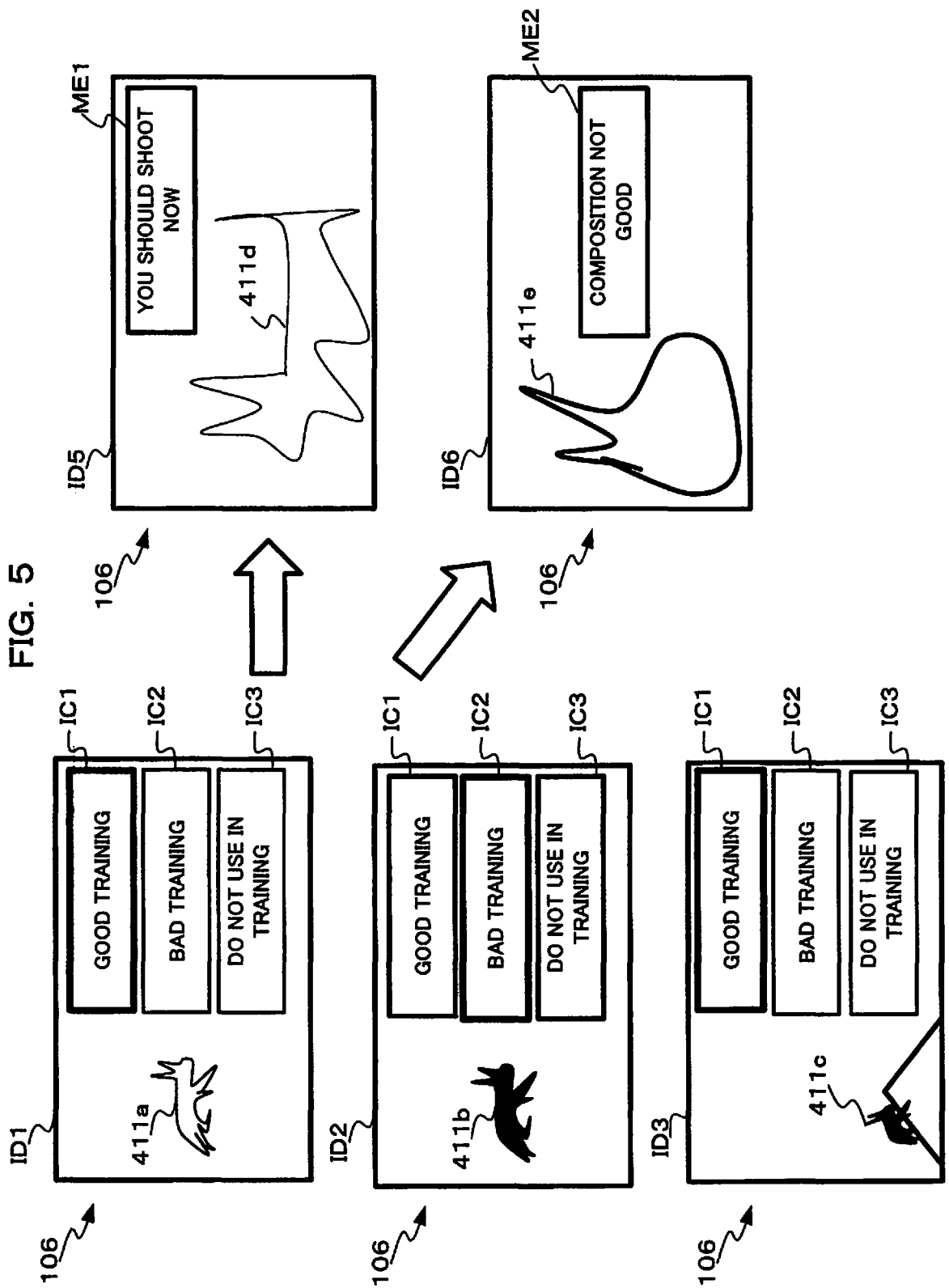
FIG. 5 is a drawing showing display images at the time inference has been performed, using an inference model that was generated, in a learning system of one embodiment of the present invention.
Figure 6:
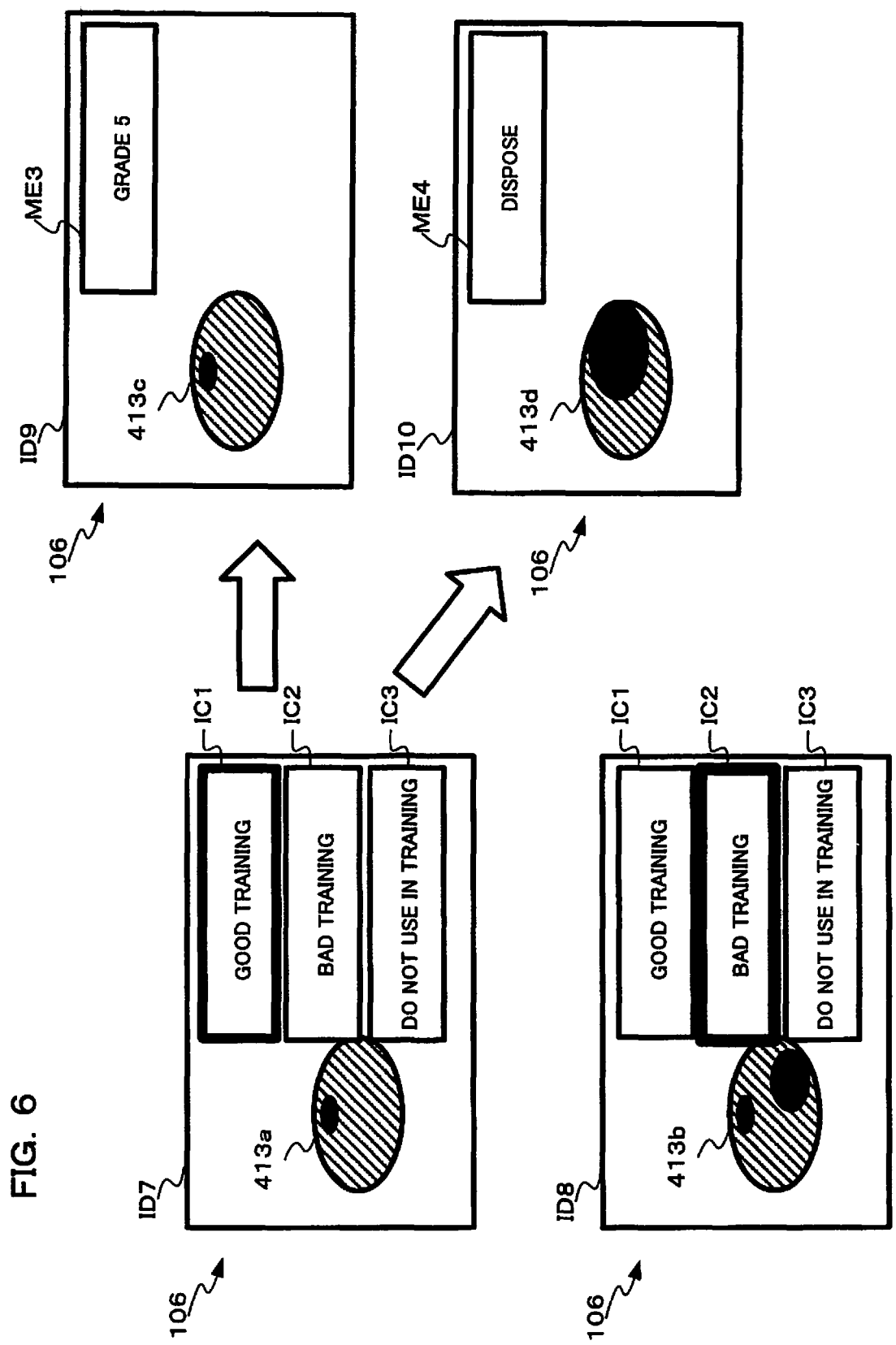
FIG. 6 is a drawing showing evaluation of a photographed physical object, in a learning system of one embodiment of the present invention.

Also, besides live view images, for example, metadata MD1 to MD3 such as shown in FIG. 2B and FIG. 3B, icons IC1 to IC3, and IC11 to IC13 such as shown in FIG. 4 to FIG. 6, and advice ME1 to ME6 based on inference results such as shown in FIG. 5 to FIG. 7, etc. are displayed on the display section 106. The display section 106 functions as a display (display section) that displays icons relating to annotation related information together with display of images based on image data (refer, for example, to S11 in FIG. 8A). Also, icons displayed on the display (display section) may also include icons for instructing not to use as annotation related information (refer, for example, to icon IC3 in FIG. 4). The display (display section) displays images (taken images) and icons for confirmation over a predetermined time, afterimage data has been input using the image input section.

The communication section 107 has a communication circuit for performing transmission and reception. The communication section 107 can perform communication with a communication section B203 within the learning request section 200 and can also perform communication with a communication section A305*a* within the learning section 300. The communication section 107 functions as a communication circuit (communication section) that transmits an image file with metadata for annotation that was created in the file creation section 101*ab* to the learning section 300 (refer, for example, to S47 in FIG. 8B).

The control section 101 has a processor and is made up of an ASIC (application-specific integrated circuit) including a CPU (central processing unit) etc. and including various peripheral circuits. The control section 101 has a storage control section 101*a*, a setting control section 101*b*, a communication control section 101*c*, an image processing section 101*d*, a parameter control section 101*e*, and a display control section 101*f*. Each of these sections is realized using hardware circuits, and some sections are realized in accordance with a CPU and programs that have been stored in nonvolatile memory. The control section 101 controls the whole of the camera 100 in accordance with a CPU and programs.

Also, there is a clock section having a clocking function within the control section 101. This clock section functions as a clock section that acquires continuous time information. The control section 101 also has a sensor information acquisition section that is input with information on various sensors (not shown), such as an acceleration sensor within the camera, and acquires information of the sensors. This sensor information acquisition section acquires sensor information other than images in accordance with continuous time.

The control section 101 fulfills a function as an image input section that inputs image data that has been converted based on images. It should be noted that with this embodiment, the imaging section 103 is arranged within the camera 100. However, the present invention is not limited to this structure and the imaging section 103 may be arranged externally to the camera body, and the camera 100 may be configured to input image data from an external imaging section. Specifically, the imaging section does not need to be provided inside the image file generating device, and in this case image data should be acquired from outside. Also, the functions of the control section 101 and the imaging section 103 may be fulfilled by a single processor, and the functions of the control section 101 and the imaging section 103 may be fulfilled by two or more processors.

The storage control section 101*a* controls storage of image data etc. that is stored in the storage section 105. Specifically, the storage control section 101*a* control storage of image data that has been acquired by the imaging section 103 and subjected to processing by the image processing section 101*d*.

The control section 101 has a file creation section 101*ab*. The file creation section 101*ab* creates the previously mentioned image file 105*b* with metadata for annotation. This file creation section 101*ab* creates an image file at the time of image storage in which image data and other supplemental data (annotation related information) of that image data are associated. This image file is created by defining and organizing image associated information in accordance with a predetermined rule as information of training data for machine learning. An image file that has been created by this file creation section 101ab is stored as an image file 105b with metadata for annotation, in a region of the storage section 105.

The above described annotation related information as other supplemental data is the concern of the user, namely information that the user is interested in. The file creation section 101ab is input with annotation related information manually by the user or automatically, and so a file is created by creating metadata based on this annotation related information, and attaching to the image data. As a method for the user to input annotation related information manually, input may be performed by performing a touch operation on icons such as described in FIG. 4 to FIG. 6, for example. Also, icons may be selected using a cross shaped button or the like, and besides this text may be directly input. It is also possible for the image processing section 101d within the control section 101 to analyze images, and to acquire icon related information based on sensor output of sensors etc., not shown.

Figure 8A:
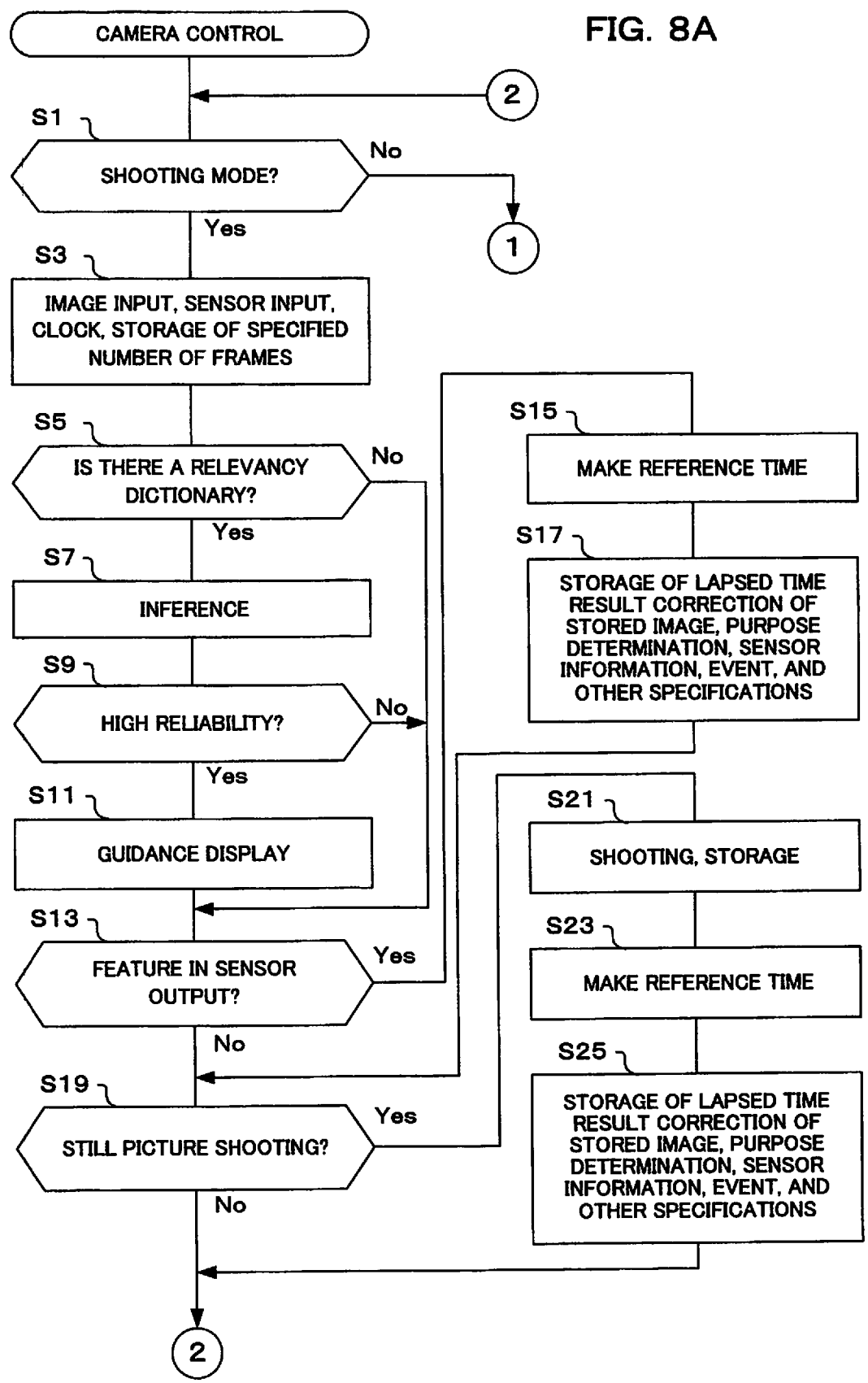
FIG. 8A and FIG. 8B are flowcharts showing control operation of a camera, in the learning system of one embodiment of the present invention.

The file creation section 101ab functions as a file creation section that inputs selectively organized information as annotation related information corresponding to image data, and attaches this annotation related information to the image data as metadata to create a file as training data, so that it is possible to output classified user's concerns regarding input images, as inference results (refer, for example, to S25 in FIG. 8A, etc.). Annotation information for generating an inference model includes a selectable information signal so as to constitute information for which user's concerns regarding input images have been selectively organized (refer, for example, to metadata MD1 in FIG. 2B, metadata MD2 and MD3 in FIG. 3B, and icons IC1 to IC3 in FIG. 4, FIG. 5 and FIG. 6). The file creation section creates a file by attaching annotation related information that has been selected using an input interface (selection section) to image data as metadata. The file creation section generates a file in which metadata has been attached based on icons that are displayed for a predetermined time in order to perform image display (for example, Quickview), and that have been selected using the input interface (selection section) (refer, for example, to icons IC in FIG. 4 to FIG. 6, and to S25 in FIG. 8A).

The above described information that has been selectively organized is organized here for every item so that there is no missing or oversight of input of user's concerns regarding images. Information that has been selectively organized is standardized as input information to a learning device, thereby improving consistency of an interface at the time of information delivery. With this embodiment, items are organized by being divided into a plurality of items, but it is not necessary for the user to select all items and it may be in a way such that only a certain item is selected. Also, selective switching such as for good or bad within selected items, or objective or subjective, etc. (points of note within items, axes within items, or feature designation within items, and directivity and weight within items, etc.) does not need to be simple alternatives, and degrees and extents may be input, and it may also be possible to perform setting using slide bars and dials etc. Organizing selectively also includes an idea of selecting numerical items for each item. Specifically, information that has been selectively organized as items and information that has been organized for separate items can be taken as annotation related information corresponding to image data to be input, so that a classified user's concerns can be output as inference results.

A file generation section generates training data by including results corresponding to lapse of time are included in annotation related information (refer, for example, to within frame 2b in FIG. 2B, within frame 3b in FIG. 3B, and to S23 and S25 in FIG. 8A). When change has occurred in a physical object of an image, the file generation section generates a file by attaching annotation related information according to results to image data for a reference time before commencement of change that is stored in the storage section (refer, for example, to within frame 2b of FIG. 2B, within frame 3b of FIG. 3B, FIG. 7, and S23 and S25 in FIG. 8A). Also, regarding the annotation related information, annotation of a selectable information signal is included in information for inference model creation, so as to give information in which concerns of the user have been selectively organized.

Annotation related information includes information such as described in the following, for example.
(a) That image will be used as training data for what purpose?
(b) Good or bad information indicating whether training data is for inferring good things or inferring bad things. (Specifically, inference is performed as to whether what is inferred from an image is a good thing, or is a bad thing.)
(c) Is what is inferred or determined from that learning result an image itself, an event, or information, such as something relating to that image or an associated event not the image itself.
(d) Was a previous good or bad determination made subjectively, or objectively.
(e) Was time at which that good or bad determination was performed before shooting, at the time of shooting, or after shooting?
(f) Associated image group information indicating if there are images that can be used in other similar learning.
(g) Information such as was a previous good or bad determination for an overall image, a partial image, or a physical object (position designation information for within an image).
(h) Information such as if this image is made into training data directly or test data (hidden reference data).

It should be noted that "determination" has been mainly used for objective determination, but has a wide interpretation that also includes cases where determination is performed subjectively.

It is preferable that these items of annotation related information can be delivered between devices by being organized correctly, and it is also preferable that a storage section be provided in which these items of information have been organized for each item, or in table format etc. If the annotation related information is not organized, the user will not be able to correctly designate features for each item, there will be omissions and leakage, and it will become impossible to collate similar training data, which means that it is not possible obtain correct learning results that reflect the concerns of the user. Generally, a user inputs and confirms concerns expected in inference with correct use of images into a device or system by organizing for every item meeting the user's concerns. There is obviously no need for the user to confirm all items, and only predetermined items may be input. For example, although numerical value input or the like after display such as "please input how much you like this photograph" is only setting of weight of a good or bad item as an item, this is a subjective determination, and it is obvious that the item is that image itself. It is also possible to specify that items other than items that are not operated on by manual input (which may also be by means of voice input) in this way are predetermined in advance.

If standardization is achieved by organizing items in this way and simplifying considerations within respective items and axes within items, or feature designation within items and directivity and weight etc. within items, it is possible to form an abundant training data group by gathering images for the same learning purpose easily from many users. If image data is also managed by applying only feature value or resizing, it is possible for individual training data to be made into data or files that have a small memory size and are easy to deal with. By employing these schemes, it is possible to increase speed at the time of learning. Also, in recent years the fact that an inference model does not perform expected output due to the quality of the training data etc. has become a problem. However, it is possible to exclude data of bad quality by making it easy to manage data as described above. Problems such as what is disclosed as training data being exploited through falsification can also be easily measured due to data being standardized, simplified and visualized. Also, use of a system such as mutual monitoring that uses a distribution system becomes possible.

The setting control section 101b performs various settings for the camera 100. As various settings, setting such as of shooting mode etc., and setting of inference using the inference engine 104, are performed. Content of this inference that has been set is transmitted to the learning request section 200 or the learning section 300 as a specification. As a specification, for example, at the time of taking a picture of a cat, the eyes of the cats are focused on, and if advice so as to take a cute picture is desired, if the user inputs a request using the operating section 102 the setting control section 101b performs setting so that it is possible to obtain an inference model that is suitable for receiving this advice.

The communication control section 101c performs control of communication using the communication section 107. The learning request section 200 and the learning section 300 are capable of being connected through the Internet. The communication control section 101c sets transmission destination, information to be transmitted, information to be received etc. at the time of performing communication between the learning request section 200 and the learning section 300 using the communication section 107.

The image processing section 101d has an image processing circuit, and performs various image processing on image data that has been acquired by the imaging section 103. For example, the image processing circuit performs various basic image processing, such as exposure correction and noise processing, WB gain correction, edge enhancement, false color correction etc., on image data. Further, the image processing circuit applies image processing for live view image display to image data that has been subjected to the above described image processing, and also performs processing (development processing) to convert to a stored data format. Display etc. is also performed based on inference results from the inference engine 104.

The parameter control section 101e has a parameter control circuit and controls various parameters for performing shooting, for example, parameters such as aperture, shutter speed, ISO sensitivity, focal length etc.

The display control section 101f has a display control circuit, and performs control of display on the display section 106. Specifically, the display control section 101f controls display of images based on image data has been processed by the image processing section 101d. The display control section 101f also performs display control for menu screens etc. As one example, this menu display may be in the form such as the display of annotation information for training data that was shown within frame 2c in FIG. 2B, and within frames 3c and 3d in FIG. 3B. Alternatively display may be in a form in which item setting is possible such as shown in FIG. 4 to FIG. 7 and not this display, and may include various formats. Menu display may also be display that has good legibility of learning items (intentions and concerns of the user) that were organized and stored in the storage section 105, or good operability. Also, for these learning items, sharing of functions may also be performed by cooperating with the specification setting section 204 within the learning request section 200. As required, information on the menu display items may be stored at the learning request section 200 side, and as required it may also be made possible to display on the display section 106

Next, the learning request section 200 shown in FIG. 1A will be described. The learning request section 200 is a server that is capable of connecting to the learning section 300 and camera 100 etc. by means of the Internet. The learning request section 200 comprises a control section 201, image classification and storage section 202, the communication section B203, and the specification setting section 204. This learning request section 200 has a database (image classification and storage section 202) for storing training data that has been created from image data that was acquired by the camera 100, and requests inference, using reference training data 202b and test data 202c based on this image data that is being stored, to the learning section 300.

The image classification and storage section 202 has an electrically rewritable memory, and stores a physical object type A image group 202a. The image classification and storage section 202 stores image data etc. that has physical objects divided into a plurality of classification. In FIG. 1A physical object A only is shown as classification, but appropriate classification may be performed in the learning request section 200 and the plurality of physical objects may be classified and stored. Reference training data 202b and test data 202c are stored in the physical object type A image group 202a.

The reference training data 202b is training data for creating an inference model by performing deep learning. The training data is comprised of image data and information that is attached to this image data as a result of annotation. For example, in a case where there is an image of a cat, information representing that there is this cat, and position information of the eyes of the cat, are attached by annotation. By performing deep learning using these items of reference training data, it is possible to generate an inference model that, if there is a cat in an image, locates the position of eyes of the cat. Classification information of a cat etc. is attached to this reference training data 202b.

The test data 202c is training data that is used in order to detect reliability of an inference model that has been generated using the reference training data. For example, regarding an inference model for locating position of the eyes of a cat, similarly to the reference training data, test data also has information indicating position of the eyes of the cat stored, if there was a cat in an image. Specifically training data is data that is used when the learning section 300 creates an inference model, while test data is data that is used when testing the inference model. Test data may be created when the user takes a picture using the camera 100. Also, test data may also be gathered uniquely by the learning request section 200 and is not limited to being in images that have been taken by the user with the camera 100. Classification information such as for a cat is also attached to this test data 202c.

The communication section B203 has a communication circuit for performing transmission and reception. The communication section B203 can perform communication with a communication section 107 within the camera 100, and can also perform communication with a communication section B305b within the learning section 300.

When generation of an inference model by deep learning is requested from the learning request section 200 to the learning section 300, the specification setting section 204 sets a specification for that inference model. For example, if there is a cat in an image, specification of an inference model is set so that it is possible to focus on the position of the eyes of the cat, and to take a cute photograph. This specification that has been set is transmitted by means of the communication section B203 to the learning section 300, and the learning section 300 generates an inference model based on the specification. It should be noted that in a case where the specification is set in the camera 100 and an intermediation for inference model generation has been requested to the learning request section 200, the specification is transferred from the camera 100 to the learning section 300.

For determination of the eyes of a cat, such as illustrated here, it is only necessary to search specific sections within a screen, that is, only objective inference is needed, without the user's subjectivity, but conversely if an inference model is for a cute image of a cat, such an image is expressed over the entire screen rather than in specific sections, and subjective inference is therefore necessary. There are also needs such as wanting to perform inference in order to be made aware of a situation not at the moment of feeling that a cat is cute, but immediately before making a cute gesture. For this need it is necessary to have different inference models such as future inference that it would be possible to obtain such an image from now on, and not the current image itself.

If these types of request for various users are not organized, it will not be possible to obtain a correct inference model such as the user wants. It is therefore made possible for the specification setting section 204 to set a learning specification for obtaining an inference model that has correctly reflected the user's intentions, by receiving settings that have been standardized to some extent. A specification setting and storage section 204a is provided within the specification setting section 204. This specification setting and storage section 204a has an electrically rewritable memory, patternizes, classifies and stores an inference model the user wants, and makes it possible to present a specification of the inference model to the user. Information that has been classified is stored here in advance so as to select respective items that have been respectively organized. These items of information are stored by the specification setting and storage section 204a by performing in-item classification so that it is possible to display concepts side-by-side symmetrically in pairs as much as possible, or so that it is possible to manage by simplifying to 0 or 1 (this does not need to be done), so that alternatives are possible in separate items. In this way, specification of items of training data images at the time of learning are organized and stored in the specification setting and storage section 204a so that symmetrical in-item classification is made possible.

By performing adjustment by item such as described above, so-called requirement specification encoding, as it were, or simple description, becomes possible. It becomes easy to manage the specification by handling as converted code that has been classified and simplified as described above, rather than by storing a specification as it is, since those descriptions are simplified while expressing essential points for requirements, and size is also reduced. For example, when a block of a blockchain is utilized, handling and management of training data become simple. At the time of using a blockchain, image data and metadata may also be made unified data, and it is made possible to input as annotation related information so that it is possible to output as inference results with the users concerns organized. If unified data that has this annotation related information attached to image data as metadata is generated as a block at the time of blockchain management, handling also becomes easy even with a blockchain. Obviously, it is also possible to reduce infrastructure and operational load not only with a blockchain but also if a decentralized management or centralized management system are adopted.

The specification setting section 204 cooperates with the display control section 101f of the camera and performs display as will be described in FIG. 2B and FIG. 3B on the display section 106. Using this display it is possible to set, for the training data the image being displayed will be made into, what type of inference model learning it will be used for. That is, it becomes possible to perform display so that it is possible to adjust respective specifications as easy to understand alternative data, such as was shown with slashes in metadata sections MD1 to MD3 within frame 2c in FIG. 2B, within frame 3c and frame 3d in FIG. 3B. Setting specification may be displayed as a list, and may be displayed for each item, such as shown in FIG. 4 to FIG. 7.

If setting specification has been displayed on the display section 106, it is possible for the user to set for what type of purpose an inference model is desired while looking at this display. For example, as shown in FIG. 2B and FIG. 3B, which will be described later, if selection of setting specification is simple it is possible to display many items in a list that is easy to understand, and it is possible to intuitively grasp which has been selected, or has not been selected. With this embodiment, at the time of image input, since it is made possible to output expected concerns in inference that uses the user's images as inference results, it is made possible to perform input as annotation related information for image data. This annotation information is made information that has been selectively organized, so as to make standardization easy. If annotation related information is attached as metadata to image data that will be made into training data, it is becomes possible to easily make that image into training data.

The annotation related information is (1) good or bad information as to whether information obtained from that image represents a good event or a bad event, or represents that that image is good image training data or bad image training data, (2) information as to whether what is determined is an image or an event, (3) information as to whether these determinations are subjective or objective, (4) determination timing information representing whether an event etc. obtained from an image is an event that is occurring at the same time as that image, or not (information as to whether what is being determined is at the time of shooting or at a different time), (5) information as to whether good or bad determination is for an entire image, for a partial image, or for a physical object, and (6) information as to whether to make an image into training data or make into test data. It is only necessary to select at least one from selectable information (1) to (6) described above, and to include the selected information for annotation. Also in the case of generating an inference model to perform a plurality of determinations (if a plurality of items are made annotation at the time of learning, it is possible to obtain a plurality of inference results, and so inference for a plurality of items and inference models for a plurality of items may be written) it may be made possible to perform priority selection. In this case, if the annotation related information further includes at least one of purpose information for designating purpose of the inference model, or related image group information, it is possible to obtain an inference model that is capable of inference with high precision by collecting a plurality of training data.

As a result of the above described schemes, at the time of generating an inference model for performing inference by inputting images, it is possible to use information that has been selectively organized as the user's concerns, as annotation information to be attached to training data to be applied. In generating inference models to deal with respective concerns of individual users, images that the user has to hand are input, and determining specification of an inference model is expeditious and easy to comprehend. However, if it is attempted to generate training data from simple images (files), it will be necessary to describe a wide variety of requirements in detail, and the degree of difficulty for a general user will be high. However, the degree of difficulty will become lower if standardization of specifications setting is performed, and it will become possible to easily generate an inference model in response to various concerns of individual users. It should be noted that this type of specification setting does not necessarily all have to be performed by the learning request section 200, and management of specification setting may be performed by the terminal side, such as the camera 100, and the camera 100 may cooperate with the learning request section 200.

The inference engine 205 stores inference models, and performs inference for image data that has been input, using inference models that have been stored. The learning request section 200 inputs and stores inference models that have been generated by the learning section 300, which will be described later, means of the communication section B305b. Similarly to the inference engine 104, the inference engine 205 has a network design, and may store similar administration information to the administration information 104b. The inference engine 205 also has a reliability determination section similar to the reliability determination section 304a within the input output modeling section 304.

The network design within the inference engine 205 has intermediate layers (neurons) arranged between an input layer and an output layer, similarly to the network design 104a. Image data is input to the input layer. A number of layers of neurons are arranged as intermediate layers. The number of neuron layers is appropriately determined according to the design, and a number of neurons in each layer is also determined appropriately in accordance with the design. Intermediate layers are subjected to weighting based on an inference model that has been generated by the learning section 300. Image evaluation information is output from the output layer in accordance with images that have been input to the input layer. Deep learning will be described together with description of an input output modeling section 304.

The control section 201 has a processor and is made up of an ASIC (application-specific integrated circuit) including a CPU (central processing unit) etc. and including various peripheral circuits. The control section 201 controls the whole of the learning request section 200 in accordance with a CPU and programs. It should be noted that the specification setting section 204 may be realized by a CPU within the control section 201 and program, and may also have various functions such as of a communication control section that controls the communication section B203 etc.

Next, the learning section 300 will be described. The learning section 300 is a server that is capable of being connected to the learning request section 200, camera 100 etc. by means of the Internet, for example, and generates an inference model by receiving a request from an external section, such as the camera 100, learning request section 200 etc. The learning section 300 comprises a control section 301, population creation section 302, reference training data storage section 303, input output modeling section 304, communication section A305a, and communication section B305b. This learning section 300 generates an inference model using training data, in accordance with a specification that has been requested from the camera 100 or the learning request section 200. This inference model that has been generated is transmitted to an external device (learning request section 200, camera 100) by means of the communication section A305a and communication section B305b.

The reference training data storage section 303 has an electrically rewritable non-volatile memory, and stores reference training data 202b that has been transmitted from the learning request section 200. Also, in a case where training data has been created by the camera 100 this training data is stored. As will be described later, in a case where generation of an inference model has been requested from the camera 100 or the learning request section 200, at the time of creating training data (data for learning) the population creation section 302 creates training data including reference training data, or references training data to create training data.

The population creation section 302 creates a population (training data, data for learning) when performing deep learning. The population creation section 302 may create training data constituting a population from a database that uses hardware circuits using the processor within the control section 301, or may create training data constituting a population in from a database that uses software using the processor within the control section 301. The population creation section 302 creates training data for deep learning using image data that can be used in deep learning within the learning section 300, and image data that has been accumulated in another survey etc. As was described previously, in a case where creation of an inference model has been requested from the camera 100 or the learning request section 200, a population for deep learning (training data) is created including reference training data that is stored in the reference training data storage section 303, or by referencing reference training data. The training data has information of the input output settings 302a attached thereto. Specifically, the training data has data input at the time of deep learning and output results (correct solutions) set in advance.

The input output modeling section 304 has a machine learning processor, and performs deep learning using so-called artificial intelligence (AI) to generate an inference model. Specifically, using an image data population that has been created by the population creation section 302, the input output modeling section 304 generates inference models by deep learning. Deep learning is a function approximation device capable of learning relationships between inputs and outputs.

The input output modeling section 304 has a similar structure to the network design 104a of the inference engine 104. An input layer I is input with image data that has been created by the population creation section 302. Also, image evaluation results, for example, training data (correct solution) are provided at the output layer. An inference model is generated by calculating strength (weight) of connection between each neuron within the network design, so that the input and output match. It should be noted that with this embodiment the input output modeling section 304 generates inference models using deep learning, but is not limited to deep learning, and machine learning may also be used. Also, the input output model creation section 304 does not need to be hardware circuits such as the network design, and may also generate inference models using software, using a processor within the control section 301.

The input output modeling section 304 also has a reliability determination section 304*a*. The reliability determination section 304*a* determines reliability of an inference model that has been created by the input output modeling section 304. Determination of reliability is performed, for example, by calculating a LOSS value etc. In a case where deep learning has been performed with an exercise that has been previously correctly solved (for example, OK or NG at the time of insertion), a LOSS value is a difference between an inference result with an inference model that has been generated by deep learning, and the previous correct solution.

Next, deep learning will be described. "Deep Learning" involves making processes of "machine learning" using a neural network into a multilayer structure. This can be exemplified by a "feedforward neural network" that performs determination by feeding information forward. The simplest example of a feedforward neural network should have three layers, namely an input layer constituted by neurons numbering N1, an intermediate layer constituted by neurons numbering N2 provided as a parameter, and an output layer constituted by neurons numbering N3 corresponding to a number of classes to be determined. Each of the neurons of the input layer and intermediate layer, and of the intermediate layer and the output layer, are respectively connected with a connection weight, and the intermediate layer and the output layer can easily form a logic gate by having a bias value added.

While a neural network may have three layers if simple determination is performed, by increasing the number of intermediate layers it becomes possible to also learn ways of combining a plurality of feature values in processes of machine learning. In recent years, neural networks of from 9 layers to 15 layers have become practical from the perspective of time taken for learning, determination accuracy, and energy consumption. Also, processing called "convolution" is performed to reduce image feature amount, and it is possible to utilize a "convolutional neural network" that operates with minimal processing and has strong pattern recognition. It is also possible to utilize a "Recurrent Neural Network" (Fully Connected Recurrent Neural Network) that handles more complicated information, and with which information flows bidirectionally in response to information analysis that changes implication depending on order and sequence.

In order to realize these techniques, it is possible to use conventional general-purpose computational processing circuits, such as a CPU or FPGA (Field Programmable Gate Array). However, this is not limiting, and since a lot of processing of a neural network is matrix multiplication, it is also possible to use a processor called a GPU (Graphic Processing Unit) or a Tensor Processing Unit (TPU) that are specific to matrix calculations. In recent years a "neural network processing unit (NPU) for this type of artificial intelligence (AI) dedicated hardware has been designed to be capable being integratedly incorporated together with other circuits such as a CPU, and there are also cases where such a neural network processing unit constitutes apart of processing circuits.

Besides this, as methods for machine learning there are, for example, methods called support vector machines, and support vector regression. Learning here is also to calculate discrimination circuit weights, filter coefficients, and offsets, and besides this, is also a method that uses logistic regression processing. In a case where something is determined in a machine, it is necessary for a human being to teach how determination is made to the machine. With this embodiment, determination of an image adopts a method of performing calculation using machine learning, and besides this may also use a rule-based method that accommodates rules that a human being has experimentally and heuristically acquired.

The communication section A305*a* and the communication section B305*b* both have communication circuits for performing transmission and reception. The communication section A305*a* can perform communication with the communication section 107 within the camera 100. The communication section B305*b* can perform communication with the communication section B203 within the learning request section 200.

The control section 301 has a processor and is made up of an ASIC (application-specific integrated circuit) including a CPU (central processing unit) etc. and including various peripheral circuits. The control section 301 controls the whole of the learning section 300 in accordance with a CPU and programs. It should be noted that the population creation section 302 and the input output modeling section 304 may be realized by a CPU within the control section 301 and a program, and may also have various functions such as of a communication control section that controls the communication section A305*a* and communication section B305*b*, etc.

Next, an example of performing annotation (attachment of metadata) at the time of shooting will be described using FIG. 2A and FIG. 2B. With the examples shown in FIG. 2A and FIG. 2B, an example of inferring a relationship between an image and an event occurring after that will be described. Specifically, an image is not for enjoyment or storage of what is recorded in that image, but is used for representing a situation that will cause an event to occur after that. Specifically, images are used in learning in order predict what will result from what is actually being shown in an image (what type of event).

The examples shown in FIG. 2A and FIG. 2B are taken in a vehicle traveling direction, using a digital camera 100 in a drive recorder, so to speak. As shown in FIG. 2A, a driver drives a car, and a camera 100 that monitors in front of the car is arranged. In a case where a cat 411 has appeared at a specified time, at a specified size, and at a specified location, with the angle of view of the camera 100 (and if the direction the cat is moving in is the travel direction), there is a possibility that it will be necessary to perform sudden braking. This kind of possibility also changes in accordance with speed of the cat 411 etc. Therefore, with this embodiment, degree of danger is made known by applying inference using AI based on the posture etc. of a cat 411 depicted in images that have been acquired by the camera 100.

If a photographing lens having a specific specification is assumed, the size of the cat 411 within a taken image constitutes distance information. Images and acceleration which is characteristic to sudden braking are detected by an acceleration sensor (G sensor) etc. built into the camera 100 or mounted in the car. The graph within frame 2*b* in FIG. 2B shows time on the horizontal axis and change in acceleration on the vertical axis. Also, above the graph images that have been acquired by the camera 100 are arranged in accordance with flow of time. In this drawing, time 0 sec is a time at which sudden braking is applied by the driver in response to danger, and time (−Y sec) is a time constituting a reference, Y sec before 0 sec.

In a case where there is this type of acceleration change, information such as acceleration information is stored in an image that has been acquired. Training data (image file) for danger notification that has this information associated with image P11 as metadata MD1 is shown within frame 2c in FIG. 2B. An example of creating an inference model with image P11 that has (acceleration change) information attached made training data is shown within frame 2d in FIG. 2B With an inference model that has been obtained with this type of training data, as shown in FIG. 2A, it is possible to provide a vehicle mounted system that suggests preparation or avoidance actions for sudden braking predicted by alerting the prediction to the user in advance by means of voice and display etc.

Within frame 2c in FIG. 2B, there is shown a structural example of, in making an (event represented by an) image it is desired to detect in this type of scene into an image file, metadata (file) MD1 at the time of making into training data, or metadata (file) MD1 when making into test data. Although this is a simplified block diagram, a few main written information are shown within the frame 2c in FIG. 2B as examples. Since the "purpose" of applying this inference model is "prediction" (of an accident or the like) which is an example for which caution should be exercised, "NG" is set. Accordingly, this image also can be speculated as not for a purpose to confirm quality etc. of the image itself, and so it is set to "event" of some kind for learning. Also, it is set to "objective" since the determination is, not from a subjective determination, from an objective consideration such as a danger of an event such as sudden braking occurring. Also, it is set to "in 3 seconds" as a time since it learns an event subsequently occurring, not an event at this time. That is, metadata of this type of image requires a scheme such as attaching to an image again after the lapse of 3 seconds. Also, although not shown, information for whether to make training data for externally requested learning, or to make hidden reference data, is also preferably created in the metadata MD1.

Also, although in FIG. 2B description has been given for a case where this image is used as training data at the time of learning, whether or not the same image will actually be used as training data will change in accordance with performance of an inference model at the time of learning, and so after an inference model has been acquired metadata as to whether or not the same image will be used as training data may be appended. As a result of appending this metadata, in a case where origin of an inference model is investigated it is possible to retrieve what images were used as training data, and it is possible to prevent black-boxing of an inference model. Also, there are case where the same image is used for input for inference, and at this time, which inference model it is desired to perform inference with, for example, inference model name (inference model ID) etc., may be stored as metadata. As a result of performing this processing, it becomes possible to perform the most suitable inference. Also, if it is made possible to store inference results as metadata of an image, what type of inference results that image will output is represented, and it becomes possible to reference which images are used in what type of inference at the time of searching later. In this way, since a high-technology is used at the time of learning and at the time of inference, since there is input and output for respective cases it may also be made possible to store metadata expressing a learning phase and an inference phase, such as input images of the time of learning, output images at the time of learning, input images at the time of inference, output inference at the time of inference.

As shown within the frame 2c in FIG. 2B, it becomes possible to organize image data that has been acquire by the imaging section 103 as alternative data by displaying with a slash. Since this type of display is being performed, the user can easily select, it is also easy to handle with control means such as a computer, and there is the advantage that a small memory capacity is required for storing settings. Also, if selection is simple, as shown within the frame 2c of FIG. 2B, display becomes simple with a list in which many items are easy to understand, and which has been selected, or is being selected, can be easily grasped intuitively. Specifically, when obtaining or using an inference model using images, it becomes possible to easily understand what type of inference model is being dealt with. This is because inference of concerns the user expects with an inference model are being classified.

In this manner, with this embodiment, at the time of image input, since it is made possible to output expected concerns in inference that uses the user's images as inference results, it is made possible to perform input as annotation related information for image data. This annotation information is made information that has been selectively organized, so as to make standardization easy. If annotation related information is attached as metadata to image data that will be made into training data, it becomes possible to easily make that image into training data. It is only necessary to have data on a relationship between image data and metadata (complementary data), in order that annotation results on images do not become separated, and in this embodiment an image file is created.

The annotation related information is (1) good or bad information as to whether information obtained from that image represents a good event or a bad event, or represents that that image is good image training data or bad image training data, (2) information as to whether what is determined is an image or an event, (3) information as to whether these determinations a subjective or objective, (4) determination timing information representing whether an event etc. obtained from an image is an event that is occurring at the same time as that image, or not (information as to whether it is at the time of shooting or at a different time), (5) information as to whether good or bad determination is for an entire image, for a partial image, or for a physical object, and (6) information as to whether to make an image into training data or make into test data. It is only necessary to select at least one of selectable information (1) to (6) described above, and to include information that has been selected in that item for annotation. Also in the case of generating an inference model to perform a plurality of determinations (if a plurality of items are made annotation at the time of learning, it is possible to obtain a plurality of inference results, and so inference for a plurality of items and inference models for a plurality of items may be written), then it may be made possible to perform selection of order at the time of outputting inference items, or priority of options. In this case, if the annotation related information further includes at least one of purpose information for designating purpose of the inference model, or related image group information, it is possible to obtain an inference model that is capable of inference with high precision by collecting a plurality of training data.

As a result of the above described schemes, at the time of inputting images and generating an inference model for inferring, it is possible for annotation information, to be attached to training data for learning that will be used, to be used as information that has been selectively organized as the user's concerns. Specifically, it is possible to provide an image file generating device that includes a selectable information signal, and this image file generating device can create image data capable of creating inference model for various purposes, and a standard for those inference models. In generating inference models to deal with respective concerns of individual users, it is quick and easy to comprehend to determine specification of an inference model by using images that the user has to hand, and as the saying goes "a picture is worth a thousand words.". However, if it is attempted to generate training data from simple images (files), it will be necessary to describe a wide variety of requirements in detail, and the degree of difficulty for a general user will be high. Generating inference models in accordance with intentions of individual users becomes easy if standardization is performed as has been described with this embodiment, and it becomes possible to generate inference models that can answer various concerns of individual users.

It becomes possible to generate an inference model as a result of performing deep learning in the network design 304d within the input output modeling section 304 shown within the frame 2d in FIG. 2b, with image data with which metadata has been associated, as shown within 2c in FIG. 2B, as training data. This inference model can perform warning of the fact that danger is imminent for an image at time (−Y sec).

Next, an example of performing annotation (attachment of metadata) at the time of shooting will be described using FIG. 3A and FIG. 3B. FIG. 3A and FIG. 3B are a learning example for predictive association that is similar to that of FIG. 2A and FIG. 2B. Although FIG. 3A and FIG. 3B have the same concept as in FIG. 2A and FIG. 2B, they are not for accident prediction, and in these drawings, prediction as to whether or not there is a photo opportunity for an image so as to constitute a "model" is performed using an inference model. Accordingly, it can also be said to be prediction of an event called a photo opportunity. As a result, metadata for image prediction is associated with image data in accordance with whether or not an image of a cat, as a physical object being depicted in an image, is taken.

Looking how the cat is walking, this is a case where the cat may sit down or lie down, and prediction would be possible by the current owner. It is conceivable that this type of prediction can be performed by inference, and would constitute valuable information to users other than the owner. Without such inference, it would not be known whether or not it is worth waiting, and a photo opportunity would ultimately be lost. Generally, a photograph when a cat is curled up is a popular posture in photographs of cats, and so constitutes a model image. It is not necessarily to be a well taken image, and a model image can be very useful for camera manufactures to refer to as a sample or the like for a desire to photograph such an image.

FIG. 3A and FIG. 3B are examples where whether or not it is close to a time at which it will be possible to get an image when a cat is curled up is conveyed to the user. As a result, it is possible to reduce the user's fruitless waiting time etc. FIG. 3A shows appearance of the user taking a picture of a cat 411 using the camera 100. Taken images arranged side by side for each time, and change over time in the degree of satisfaction with the image at that time, are shown within frame 3b in FIG. 3B. Time (−X sec) represents reference time, and 0 Sec represents a time where the degree of satisfaction of the user with an image is high.

Examples of metadata for training data associated with image data are shown within frames 3c and 3d in FIG. 3B. Image P12 that was taken at time (−X sec) is shown within frame 3c in FIG. 3B, and for this image metadata for training data MD2 is created, and associated with data of the image P12. Image P13 that was taken at time (0 sec), which is a reference time, is shown within frame 3d in FIG. 3B, and for this image metadata for training data MD3 is created, and associated with data of the image P13.

Images taken at crucial moments of shooting constitute training data as images that were taken that the user thought were good, and so metadata is stored as an image with the "subjective" tag and "OK" tag. Similarly to FIG. 2A and FIG. 2B, an image that has been acquired before actual shooting is made into an image file as shown within frame 3d in FIG. 3B, at time (−X sec), as shown within frame 2b in FIG. 2B, so that learning, such as to predict a desired future by inference in a certain state, is possible. A file structure example for when this image file is made into training data, or when this image file is made into test data, is shown in the metadata here. It should be noted that based on whether or not there is the user's feeling of a risk or reluctance to expose an image outside, whether to make an image file into training data or into reference data, may be determined by manual setting or by voice input. While this is fine if a physical object is a cat, in the case of a person there will be issues with right of likeness, and such determination may be performed automatically or manually. It is possible to determine whether a physical object is a person or otherwise using face detection. In a case where the physical object is a person, correction so as to make the face unrecognizable may be performed, or training data may be created by making the person into an avatar.

Although this is a simplified block diagram, a few main written information examples are shown within the frames 3c and 3d in FIG. 3B. Since, as a "purpose" of inference, this is an example of inferring a favorable sign, such as the best shooting time having arrived, "OK" is set. Accordingly, the purpose is for confirming outcome of the image itself by looking at the image, and so it is considered that this is for learning of some image related inference. Also, since being made a best shot depends on which of subjectively good or bad has been inferred, a tag is set to "subjective" and shown. An image at this best shot timing itself has timing information made 0, as shown within frame 3c in FIG. 3B. "In 3 seconds" is set as a best shot timing in an image file for an image such as in frame 3d in FIG. 3B relating to upcoming chances since the learning is for upcoming subsequent events, not for some event at the moment of shooting in order to obtain an inference model such as in frame 3e in FIG. 3B. Also, although not shown, information for whether to make training data for externally requested learning, or to make hidden reference data, is also preferably created in the metadata MD1. In creating this type of image file, metadata of this type of image requires a scheme such as attaching to an image again after the lapse of 3 seconds.

If an image file for shooting guidance is created, as shown within frame 3c and frame 3d in FIG. 3B, it is possible to generate an inference model as a result of performing deep learning in the network design 304d within the input output modeling section 304 shown within the frame 3e in FIG. 3B, with image data with which this metadata has been associated as training data. It is possible for this inference model to give advice as to at how long should be waited for until the best time will arrive, for an image at time (−X sec).

Image data that was acquired in the imaging section 103 is capable of being organized as alternative data, as displayed using slashes in metadata MD2 and MD3 shown in frame 3c and frame 3d in FIG. 3B. Since this type of display is being performed, the user can easily select, and it is also easy to handle with a controller such as a computer, and there is the advantage that a small memory capacity is required for storing. If selection is simplified it is possible to easily display many items in a list that is easy to understand, and it is possible to intuitively grasp what has been selected, or what is not been selected. Specifically, when obtaining an inference model that used images, or when using an inference model that used images, it becomes possible to easily understand what type of inference model is being dealt with. That is, selection of metadata MD2 and MD3 is classification of user concerns that the user expects with an inference model.

In this manner, with this embodiment, at the time of image input, since it is made possible to output user concerns as inference results, it is made possible to perform input as annotation related information for image data. This annotation related information is made information that has been selectively organized, so as to make standardization easy. If annotation related information is attached as to image data as metadata, it becomes possible to easily make that image into training data. It is preferable to set a relationship with metadata (complementary data), in order that annotation results and image data do not become separated, and in this embodiment an image file is created.

Similarly to the case of FIG. 2A and FIG. 2B, annotation related information is information that can be selected from at least one item of (1) to (6) that were described previously, and it is only necessary to include the information that has been selected as annotation. Also, in the case of generating an inference model to perform a plurality of determinations (if a plurality of items are made annotation at the time of learning, it is possible to obtain a plurality of inference results, and so inference for a plurality of items and inference models for a plurality of items may be written), it may be made possible to perform priority selection, similarly to the case in FIG. 2A and FIG. 2B.

As a result of the above described schemes, at the time of inputting images and generating an inference model, it is possible, with regard to annotation information to be attached to training data for learning that will be used, to use information that has been selectively organized as the user's concerns. Specifically, it is possible to provide an image file generating device that includes a selectable information signal, and this image file generating device can create image data capable of creating an inference model for various purposes, and a standard for those inference models.

In generating inference models to deal with respective concerns of individual users, seeing is believing, and images that the user has to hand are input, and determining specification of an inference model is expeditious and easy to comprehend. However, if it is attempted to generate training data from simple images (files), it will be necessary to describe a wide variety of requirements in detail, and the degree of difficulty for a general user will be high. Generating inference models in accordance with intentions of individual users becomes easy if standardization is performed as has been described with this embodiment, and it becomes possible to generate inference models that can answer various concerns of individual users.

Next, a separate example of annotation that is performed at the time of shooting will be described using FIG. 4. This example shown in FIG. 4 is association of annotation that reflects the user's concerns (intentions) with image data, looking at Quickview images that have been displayed on the display section 106 after the user has performed shooting. Quickview images are images that are displayed over a predetermined time, in order for the photographer to confirm taken images after shooting has been completed. It should be noted that this attachment of annotation is not limited to being at the time of Quickview display, and may also be performed at the time of playback display of images that have been stored in the storage section 105.

As illustrated in FIG. 4, it is normal for the user to not consider whether to make a display image an example of a good image or make it an example of a bad image at the time of shooting. If a user takes images with only the intention that the images need to be made into training data, then in a case of performing machine learning the user's intention will not be conveyed and an unwanted learning model may be generated. For example, if there is a case where it is considered that the user no longer wants to shoot such an image, and that image is made into training data, this will be unintentionally perceived as a well taken image, and so there may be cases where subsequently it is consider that success rate is improved, and that image will be made into training data. It is preferable for users to comprehend these possibilities in order to create correct training data.

As a result, the specification setting section 204 shown in FIG. 1A acts in cooperation with the display control section 101f of the camera 100 to receive settings that have been adequately standardized, so that an inference model that can output inference results the user requests can be obtained. In this way, it is possible to set a specification for learning in order to obtain an inference model that correctly reflects the intention of the user. That is, it is made possible to perform display so that it is possible to adjust respective specifications as easy to understand alternative data, such as was shown by slashes in metadata sections MD1 to MD3 within frame 2c in FIG. 2B, within frame 3c and frame 3d in FIG. 3B. Further in FIG. 4, an example is shown where an intention, such as not making images into training data at all, can also be input. In FIG. 4, an example is shown in which large icons are displayed for every item, but the setting specification is not limited to this and icons may also be displayed as a list, for example. In FIG. 5 and FIG. 6, which will be described later, also, similarly to FIG. 4, items are classified into pairs of concepts, that are selectable alternatives. These items may be switched using a touch panel or switch provided on the camera 100.

In FIG. 4, display images ID1 to ID4 are Quickview images that have been displayed on the display section 106. Three icons IC1 to IC3 are displayed within the screen of the display images ID1 to ID3. Icon IC1 means a training image that is good as training image, icon IC2 means a training image that is bad as training data, and icon IC3 means to not use as training image data.

Display image ID1 is an example of having taken a picture of a cat 411 at an appropriate exposure, and that also has a composition that is to the user's liking. Because it is this type of image, the user considers that this image may be made into training data as a good image at the time of shooting. The user therefore selects icon IC1 representing that it is "good training data". As a method of selecting this icon, if a touch panel is provided on the display section 106 the user may perform selection using a touch operation, and the user may also select icon IC1 by operating a cross shaped button within the operating section 102.

If the user selects icon IC1 ("good training") for display image ID1, next, image ID4 is displayed on the display section 106. This image ID4 is a screen for performing classification of the image, and has icons IC11 to IC13 displayed. Specifically, icon IC11 sets "pet" as a classification, icon IC12 sets "scenery" as a classification, and icon IC13 sets "portrait" as a classification. The control section 101 of the camera 100 may perform image analysis of the display image, and display icons IC11 to IC13 as classification candidates. Classification may be selected in line with the intention of the user themselves.

Next, display image ID2 is an example where composition of the cat 411b is not bad, but shooting has not been performed with the correct exposure. Because it is this type of image, the user considers that this image may be made into training data as a bad image at the time of shooting. The user therefore selects icon IC2 representing that it is "bad training data". This selection method can be performed using a touch operation or operation of an operation member etc., similarly to the case for icon IC1. Even in the case where an image is used as bad training data, then similarly to display image ID4, classification such as pet etc. is performed.

Display image ID3 is an example where exposure of the cat 411c is not correct, but composition is interesting. The user considers that this type of image may be good for training data, as a good image for shooting. The user therefore selects icon IC1 representing that it is "good training data". This selection method can be performed using a touch operation or operation of an operation member etc., similarly to the case for icon IC1. Whether an image is good or bad is selected here in accordance with the user's subjective view, and so it can be said that automatic determination is difficult. As a result, it is preferable to issue a learning request based on the intentions of the user, by performing display that makes it easy to select good or bad.

If the user has selected any of the icons IC1 to IC3, annotation is associated with image data depending on the icons IC1 to IC3, and stored in the storage section 105 as an image file 105b with metadata for annotation. The camera 100 transmits this image data having metadata for annotation as training data to the learning section 300, either by means of the learning request section 200 or directly. The input output modeling section 304 of the learning section 300 generates an inference model using training data to which this annotation has been attached. This inference model constitutes a model that is in line with a subjective evaluation of the user.

Next, display of training data, and of inference results from an inference model that was generated using training data, will be described using FIG. 5. In FIG. 5, the user selects any of the icons IC1 to IC3 for display images ID1 to ID3, and performs annotation on image data. As was described previously, an inference model is generated by using image data to which this annotation has been attached as training data. This inference model is stored in the inference engine 104 of the camera 100, and it is possible to perform inference for images that have been acquired using the imaging section 103.

Display images ID5 and ID6 show appearance of inference results that are being displayed for images that were acquired using the imaging section 103. A cat 411d that is depicted in display image ID5 has a composition the user likes, and has correct exposure, and so a result of having performed inference using the inference model, advice ME1 recommending shooting, namely "Now would be a good time to take a picture!" is displayed. On the other hand, the cat 411e that is depicted in display image ID6 does not have a composition that the user likes and so advice ME2 not recommending shooting, specifically "Composition is no good!" is displayed.

The examples shown in FIG. 4 and FIG. 5 are examples that use taken images as training data, and in which the user performs evaluation as to whether they are good or bad. In other words, they are examples where the subjective evaluation of the user is associated with image data as metadata. The example shown in FIG. 6 is an example where a subjective determination as to whether or not a physical object good or bad is made into annotation for a taken image, and image data having metadata for this annotation is generated.

In FIG. 6, icons IC1 to IC3 are displayed on the display screen of the display section 106, similarly to FIG. 4 and FIG. 5. A mandarin orange 413a is displayed on display image ID7, and this mandarin orange 413a is a quality product. Whether or not there is a quality product may be determined using a separate inspection device, and may also be determined by visual inspection by the user. The user selects icon IC1 representing that there is a mandarin orange of good quality, specifically, "good training" on the display screen being displayed by the display image ID7.

Also, a mandarin orange 413b is displayed on display image ID8, and this mandarin orange 413b is a defective product. Whether or not there is a defective product may be determined using a separate inspection device, and may also be determined by visual inspection by the user. The user selects icon IC2 representing that there is a mandarin orange of bad quality, specifically, "bad training" on the display screen being displayed by the display image ID8.

In display images ID7 and ID8 also, if the user has selected any of the icons IC1 to IC3, annotation is associated with image data depending on the icons IC1 to IC3, and stored in the storage section 105 as an image file 105b with metadata for annotation. The camera 100 transmits this image data having metadata for annotation as training data to the learning section 300, either by means of the learning request section 200 or directly. The input output modeling section 304 of the learning section 300 generates an inference model using training data to which this annotation has been attached. This inference model constitutes a model that is in line with a subjective evaluation of a physical object.

Display images ID9 and ID10 show appearance of inference results that are being displayed for images that were acquired using the imaging section 103. A mandarin orange 413c depicted in display image ID9 has an inference result from the inference engine 104 indicating that it is a quality product of grade 5, and so "grade 5" is displayed as an inference result display ME3. On the other hand, a mandarin orange 413d depicted in display image ID10 has an inference result from the inference engine 104 indicating that it is a defective product that should be disposed of, and so "dispose" is displayed as an inference result display ME4.

Next, an example of performing inference to predict the future and displaying that inference result will be described using FIG. 7. Display using slashes in metadata sections MD1 to MD3 within frame 2c in FIG. 2B and within frames 3c and 3d in FIG. 3B, in order to adjust various specifications as alternative data that is easy to understand, will be described. Also, displays are illustrated in FIG. 4 to FIG. 6, such that it is possible to select various specifications clearly in the form of alternatives. In FIG. 7, an example where it is not absolutely necessary to select from a plurality of alternatives will be described. This is an example where even if the user does not perform selection manually, selection of alternatives etc. automatically should be possible.

Since items are organized in advance, it represents that simple alternatives, item selection, or specification selection within items can be easily automatically determined.

With the example shown in FIG. 7, images are stored chronologically, and in the case where good results and bad results have occurred the user generates training data that has results of previous images associated as annotation. Deep learning is performed using this training data, and an inference model is generated. This inference model is stored in the inference engine 104 of the camera 100, and inference results are displayed for images that were acquired by the imaging section 103.

In FIG. 7, stored image RI1 is an image that was taken at time T1 and stored in the storage section 105. At time T2 which is after time T1 an accident occurs, and stored image TI2 is an image at that time. Specifically, image RI1 at time T1 is an image showing the state where a car 415a is traveling. Also, the image at time T2 is an image showing the state where the car 415b has been involved in an accident. Then, in the image RI1, since an accident occurred at time T2, it is possible to store "accident determination"="bad training data" in metadata as annotation, simply from a logical aspect or by inference. As a similar example, an operation such as performing certain braking, as shown in FIG. 2A and FIG. 2B, may also be classified subjectively as a dangerous situation. Training data for solving subjective problems like this can simply facilitate alternatives for specific items, by situational awareness utilizing various sensors. Also, whether or not it is for a subjective evaluation, or whether good sample or bad sample is searched for in an inspection, may also be determined by means of a system that acquires images etc. Metadata may reflect this.

It should be noted that icons IC1 to IC4 for the user to apply annotation, such as shown in FIG. 5 and FIG. 6, are not displayed in FIG. 7, but icons for applying these annotations may also be displayed. Also, manual setting while looking at a screen at the moment of an accident is not realistic, but manually input is also possible for situations other than an accident. Besides "accident=bad thing", automatic selection of good or bad is easy using detection of voice, such as voice uttered by users indicating that they are satisfied. It is also easy to classify images that have been erased immediately by users as bad images, and images that remain after selecting carefully from many candidates as good images. Also, discrepancies in focus, exposure, and composition can also be used in automatic determination of good or bad.

Deep learning is performed using a great number of image data that have metadata for annotation, such as stored images RI1 and RI2, and an inference model is generated. For display images ID11 and ID12 it is possible for the inference engine 104 to predict future events using an inference model. In the case of display image ID11, since a bad situation such as the vehicle 415d being involved in an accident is not predicted, "alright" is displayed as inference result display ME5. In the case of display image ID12, since a bad situation such as the vehicle 415e being involved in an accident is predicted, "Danger!" is displayed as inference result display ME6.

It should be noted that in stored image RI3 the car 415c is traveling on an inclined surface, and it is better not to use images of this type of situation in deep learning. Therefore, "Not for use." indicating not to use as training data is attached as annotation for stored image RI3. In this way, annotation is not attached as training data for all of the stored images R1, and they are not used. Discrimination in accordance with whether to attach annotation or not attach annotation is therefore performed, as in stored images RI2 and RI3.

Figure 8B:
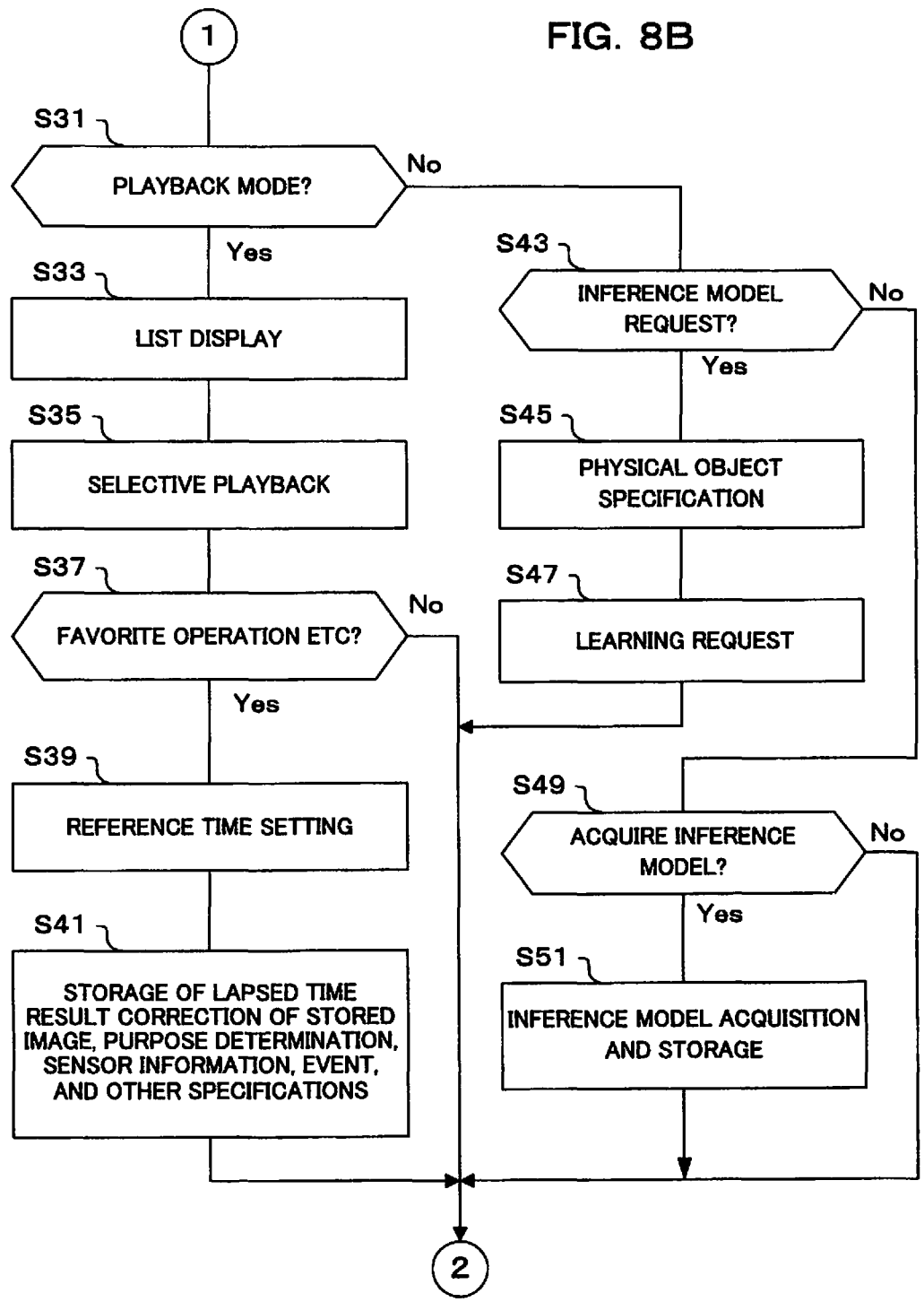

Next, control operations of a camera that is capable of attaching metadata such as shown in FIG. 2A to FIG. 7 will be described using the flowcharts shown in FIG. 8A and FIG. 8B. This operation is realized by a CPU within the control section 101 within the camera 100 in accordance with a program that has been stored in memory.

It is necessary for the operations in FIG. 2A and FIG. 2B, and in FIG. 3A and FIG. 3B, to be made elaborate so as to attach metadata of images to images again, after the lapse of a predetermined time, in order to create an image file that constitutes training data such as for learning upcoming subsequent events after shooting, not at the moment of shooting. The flowchart shown in FIG. 8A and FIG. 8B realize control of a camera that is capable of attaching this kind of metadata (file creation device). Also, with this flowchart, other sensor information, such as acceleration information, such as was shown in FIG. 2A and FIG. 2B, and in FIG. 3A and FIG. 3B, is used and referenced. These items of information may be from sensors that are built into the camera 100, and may be obtained by cooperation with sensors within other devices using IoT. In the following, the flowchart of FIG. 8A and FIG. 8B will be described.

If the flow shown in FIG. 8A is commenced, it is first determined whether or not the camera is in shooting mode (S1). It is possible to set various modes such as playback mode, shooting mode, inference model acquisition mode etc. in the camera 100. In this step, the setting control section 101b within the control section 101 determines whether or not shooting mode has been set.

If the result of determination in step S1 is shooting mode, then image input etc. is performed (S3). Here, the control section 101 acquires images using the imaging section 103, and performs live view display on the display section 106. Acceleration information etc., is also input using other sensors, as was described previously. Further, a clocking operation is commenced, in order to measure change over time, such as was shown within frame 2b in FIG. 2B, and within frame 3b in FIG. 3B. The number of frames that have been acquired by the imaging section 103 is also stored. It should be noted that shooting may be movie shooting, and may be continuous shooting.

If image input etc. has been performed, it is next determined whether or not there is a relevancy dictionary (S5). A relevancy dictionary is an inference model corresponding to shooting scenes with the camera, and it is determined whether or not an inference model suitable for a current photographed object is set in the inference engine 104.

If the result of determination in step S5 is that there is a relevancy dictionary, inference is executed (S7). Here, image data that was acquired in step S3 is input to the inference engine 104, and inference is executed. For example, image data having metadata for annotation is created at the time of shooting, or at the time of playback after that), as was described using FIG. 4 to FIG. 7, and the input output modeling section 304 generates an inference model using this image data as training data. In this step S7, inference is executed using the inference model that has been generated by the input output modeling section 304.

Next, reliability of inference results is determined (S9). If the result of this determination is that reliability is high, guidance display is performed (S11). Here, warning display and shooting guidance such as shown in FIG. 2A and FIG. 3A is displayed. Also, advice ME1 recommending shooting and advice ME2 not recommending shooting are displayed on the display section 106 in accordance with the inference results, as shown in FIG. 5. Further, advice ME3 and ME4 indicating whether a physical object is a quality product or defective product is displayed on the display section 106 in accordance with the inference results, as shown in FIG. 6. Further, advice ME5 and ME5 so as to predict future events is displayed on the display section 106 in accordance with inference results, as shown in FIG. 7.

Once guidance display has been performed, it is next determined whether or not there are features in sensor output (S13). Here, sensor output that was input in step S3 is referenced, and it is determined whether or not there are features in the sensor output, or whether or not it is possible to predict a specified event from characteristic variation patterns. It should be noted that determination is not limited to sensor output, and may be based on results of image analysis, such as a cat having entered into an image, for example.

If the result of determination in step S13 is that there are features in sensor output, reference time creation is performed (S15). Here, time at which a particular event has occurred is automatically set as reference time so that it is possible to measure elapsed time after that, and measuring of time is commenced. For example, with the examples shown in FIG. 2A and FIG. 2B, a time at which a vehicle is subjected to sudden braking is a reference time, and with the example shown in FIG. 7 the time at which an accident occurred at time T2 is a reference time.

Once reference time has been set and measuring time has commenced, next, elapsed time result correction of stored images, usage determination, and storage of sensor information, events and other specifications etc. are performed (S17). This processing performs storage of metadata with sensor output as a trigger. Specifically, it is made possible to append time information to metadata of images that have already been stored. In this step S17, the output information itself, and event information etc. that has been obtained based on that sensor output information is stored as metadata. In elapsed time result correction of stored images, once reference time has been determined in step S15, images stored in time series are organized in accordance with passage of time from the reference time. Also, purpose is set from a specification etc. For example, in a case where information inherent to sudden braking has been acquired from acceleration sensor information, speed sensor information and position information sensor change information etc., storage etc. may be performed for the fact that this event (for example, a cat flying out) has been detected since sensor data became some kind of value (change). The storage in this step may also be performed manually by the user, but may also be performed automatically in a case where there are features in sensor output.

If storage has been performed in step S17, or if the result of determination in step S13 is that there are no features in sensor output, it is next determined whether or not there is still picture shooting (S19). Here, a condition for shooting to be performed is not always limited to by means of a release switch operation. For example, shooting may be performed by using results of sensor data etc. In the case of other than release switch operation, by what kind of operation it has been determined as still picture shooting in step S19 may be stored. Metadata of an image file is changed by associating an event that has been detected by this type of sensor data or operation, and an image.

If the result of determination in step S19 is still picture shooting, shooting is actually performed, and image data that has been acquired as a result of shooting is stored (S21).

Next, similarly to step S15, reference time creation is performed (S23). This is a case where an operation such as of the release button etc. has been performed by the user, and adjustment of images is performed with this time made a reference.

Then, similarly to step S17, elapsed time result correction of stored images, purpose determination, and storage of sensor information, events and other specifications etc., are performed (S25). In a case where a photograph in which a cat is coiled up is taken, described in FIG. 3A and FIG. 3B, a reference time should be made the release timing, and is set in this step S25. As a result of this processing it is possible to create an image group immediately before sudden braking, such as was shown in FIG. 2A and FIG. 2B, and it is possible to create training data constituting big data. Storage of metadata here may by performed manually by the user, but the camera can automatically store metadata.

Also, after shooting of still pictures icons IC1 to IC4 are displayed, as was shown in FIG. 4, and it may be made possible to attach metadata for annotation to image data based on the subjectivity of the user. Similarly, after shooting of still pictures icons IC1 to IC4 are displayed, as was shown in FIG. 6, and it may be made possible to attach metadata for annotation to image data based on subjectivity evaluation results. Further, metadata for annotation may be attached to image data, for images that have been taken consecutively, like the examples that were shown in FIG. 2A, FIG. 2B, FIG. 3A, FIG. 3B, and FIG. 7.

Returning to step S1, if the result of determination in this step is that it is not shooting mode, it is next determined whether or not the camera is in playback mode (S31). If the result of this determination is playback mode, list display is performed (S33). Here, image data being stored in the storage section 105 is read out, and subjected to this display on the display section 106. Next, selective playback is performed (S35). Since the user selects magnified display from within the list display, it is determined in this step whether any image has been selected or not.

It is next determined whether or not a favorite operation has been performed (S37). With this embodiment, in a case where the user themselves, or a person who has confirmed an image, wants to store the time of an event while looking at a stored image that has been played back, a favorite operation is performed using the operating section 102. In this step, it is determined whether or not this operation has been performed. In a case where a favorite operation has been performed, a reference time is set (S39). Here, the time (timing) for storing a playback image is made a reference time, and where this reference is set is input manually.

Next, temporal result correction of each images that has been stored, and storage of purpose determination, sensor information, events and other specifications etc., is performed (S41). In steps S17 and S25 also, similar metadata is stored, but in this step there is mainly manual user input. Obviously, metadata that is stored in a playback image may be maintained, and only metadata that has been manually input may be rewritten.

Returning to step S31, if the result of determination in this step is that it is not playback mode, it is next determined whether or not there is an inference model request (S43). It is determined whether or not an inference model has been requested from the camera 100 directly to the learning section 300. If the result of this determination is that an inference model is requested, physical object of the inference model is specified (S45), and learning for creating an inference model is requested to the learning section 300 (or to the learning section 20 by means of the learning request section 200) (S47). Here, images with metadata may be transmitted from the communication section 107 to the learning section 300 as training images for specified event prediction. For example, an image file that was created by the file creation section 101ab, in FIG. 2A to FIG. 7 (image file having metadata for annotation), may be transmitted. Also, the file creation section 101ab may attach information as to whether or not a warning should be provided about a specified event, as metadata, in an image file when transmitting.

If the result of determination in step S43 is that there is not a request for an inference model, it is determined whether or not there is image model acquisition (S49). If learning has been requested in step S47, the learning section 300 generates an inference model and returns the inference model to the camera 100. Here, it is determined whether or not an inference model for return to the camera 100 will be acquired. If the result of determination in step S49 is to acquire an inference model, an inference model is acquired and stored (S51). Since an inference model that has been newly acquired in this way functions as an improved inference model that suits a practical user, just like a capable person who works on various practical on-the-job training, the degree of satisfaction of the user who will use this inference model is further improved. In a case where the inference model has been sufficiently improved, setting may be performed so as not to perform additional learning. It may also be made possible to describe this setting in metadata.

Also, by performing too much additional learning, conversely, it can be considered that it will result in an inference model of the specification that is different to the original purpose. Inference models should therefore be subjected to version management in order to be able to return to the previous version. At the time of additional learning, there is still a problem of which version of inference model should be added to, but a version to be added to may be described in metadata. To do this, a method may be adopted in which the version of the inference model currently being used is stored as metadata. In order to manage metadata, it is preferable for the file creation section 101ab (metadata assignment section) to assign identification that shows the inference model to be applied to additional learning, in a request for an additional learning by transmitting an image file to an external learning device.

In the operation of this flow, some processes have been shown simplified. For example, parts of the specification setting etc. may be initially performed (for example, specification for certain braking prediction when used as a drive recorder), but in this flow portions such as being able to perform manual input at the time of creating an image file are emphasized (the user may perform setting at times such as S17, S25, S41 etc.). Also, in a case where some inference is possible based on images that have been involved in step S3, guidance display is performed in step S11. In this case, when there is an associated inference model (dictionary) reliability is high, only results that are actually meaningful are displayed in a guidance display.

If the result of determination in step S37 is that there is not a favorite operation, or if storage etc. has been performed in step S41, or if an inference model has been acquired in step S51 and this inference model has been stored, or if the result of determination in step S49 is not to acquire an inference model, processing returns to S1.

In this way, in the camera control flow, image data is input from the imaging section, and an image is displayed based on this image data (S3). If still picture shooting is performed, taken images are displayed, and at this time icons IC1 to IC3, and IC11 to IC13 etc. are also displayed (refer to FIG. 2A to FIG. 7). Then, if the user selects an icon, an image file having metadata for annotation is generated based on that icon (refer to S25). Once an image file has been created, it is transmitted to the learning section 300 (S47), and an inference model is created. If this inference model that has been generated is received (S51), inference at the time images were input is performed (S7), and guidance display is performed based on inference results (S11).

In one embodiment of the present invention, an image is converted to image data and this image data is output (S3), information that has been selectively organized so as to be able to output concerns of users that have been classified as inference results is input as annotation related information corresponding to image data, and a file is created with this annotation related information attached to the image data as metadata (refer to the file creation section 101ab in FIG. 1B, and to S25). As a result, it is possible to generate training data that is effective in generating and inference model so as to be able to answer user concerns.

It should be noted that with the one embodiment of the present invention a system that comprises a combination of a camera 100, a learning request section 200 and a learning section 300 has been described. However, this combination is not limiting, and it is also possible for the camera 100 to have combinations of functions of the learning request section 200, and for the learning request section 200 to have functions of the learning section 300.

Also, with the one embodiment of the present invention, metadata is data for supplementing and describing specific information, and so metadata has been stored within the same file together with this specific information (image) in order to be easily supplemented. However, this is not limiting, and it may be made possible to store files, data, folders etc. individually. In this case, management may be performed using data names etc. so as to associate metadata and images, and management may be performed inseparably with a specified system.

When a user wants to utilize an inference model for specific concerns, needs such as a desire to acquire some information increase for specific visual scenes. In this type of case, if training data is generated simply with reference to an image, if simplification is not performed using specific standardization, operations become elaborate and are not realistic. However, by having a scheme such as shown in the one embodiment of the present invention, since inference models that answer respective concerns of individual users are generated simply for respective scenes, it becomes possible to easily create training data.

Also, in the one embodiment and modified example of the present invention, learning in the learning device has been performed using deep learning, but this is not limiting, as long as it is learning that uses artificial intelligence, such as machine learning. Also, in recent years, it has become common to use artificial intelligence, such as being able to determine various evaluation criteria in one go, and it goes without saying that there may be improvements such as unifying each branch etc. of the flowcharts shown in this specification, and this is within the scope of the present invention.

Also, in the one embodiment of the present invention, within the learning section 300 the population creation section 302, reference training data storage section 303, input output modeling section 304, communication section A305a, communication section B305b etc. have been constructed separately to the control section 301. Also, within the learning request section 200 the image classification and storage section 202, communication section B203, specification setting section 204, inference engine 205 etc. have been constructed separately to the control section 201. Further, within the camera 100 the operating section 102, imaging section 103, inference engine 104 storage section 105, display section 106 etc. have been constructed separately to the control section 101. However, this is not limiting, and some or all of these sections may be configured as software, and executed by CPUs within the control sections 101, 201 and 301. Each section within the control section 101 may also be provided using hardware circuits outside the control section.

Also, the CPUs provided within each of the control sections are not thus limited, and may be elements that provide functions as a controller, and processes of each of the above described sections may be performed by at least one processor that has been constructed as hardware. For example, each section may also be configured with a processor that is constructed as respective electronic circuits, and may also be each circuit section of a processor that has been constructed as an integrated circuit such as an FPGA (Field Programmable Gate Array). Alternatively, functions of each section may be executed by a processor that is constructed of at least one CPU reading out and executing computer programs that have been stored in a storage medium. It is also possible for each of the above described sections to have a hardware structure such as gate circuits that have been generated based on a programming language that is described using Verilog, and also to use a hardware structure that utilizes software such as a DSP (digital signal processor). Suitable combinations of these approaches may also be used.

Also, with the one embodiment of the present invention, the camera 100 has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. The present invention may be applied to an endoscope, as a medical camera. It is possible to arrange an imaging section in an insertion section of an endoscope, and to also generate training data for images that have been acquired by this imaging section by adopting the techniques of the present invention.

Also, the imaging section may be formed separately from the camera body, and information on annotation relationships may also be attached to images that have been input from a separate imaging section. In a case where the imaging section is integral, it may be guaranteed that the photographer and a person performing annotation are the same person, and the security of the guarantee of copyright etc. may be secured by biometric authentication etc. The photographer and the person performing annotation do not need to be the same person.

Also, various data that is managed within each server (learning section 300 and learning request section 200), or some of that data, may be managed with a centralized database that has been shown in the embodiment, and this data may also be managed in a mutual monitoring way using a decentralized (distributed) database such as a blockchain. With a centralized database, at the time some kind of problem arises, it becomes no longer possible to manage that data until fault repair of the system, but with a distributed database it is possible to reduce faults.

When performing management of data, ensuring reliability of the data is crucial. If there is a risk of public data that it is expected will be made into training data being tampered with, there may be cases where the effort put in by a well-meaning user will be destroyed. Also, without assurance for a user in this regard, their motivation to make training data public will be lowered. However, if standardization is performed by organizing items, to simplify points to remember within respective items, axes within items, or feature designations within items and directivity and weights within items, as with this embodiment, then as well as correctly reflecting the user's intentions and being able to increase speed at the time of learning, quality assurance using a monitoring system also becomes easy to do. Further, if image data is also managed by applying only feature value or resizing, it is possible for individual training data to be made into data or files that have a small memory size and are easy to deal with.

This type of integrated data can be used, for example, in a system such as mutual monitoring using a distributed system etc. In recent years, the fact that an inference model does not perform expected output due to the quality of the training data etc. has become a problem. However, by making it easy to manage data, as in this embodiment, it becomes possible to prevent bad quality data from being distributed and spread, which promotes many users to use the system with security, and it is then made possible to form an abundant training data group. Specifically, it is possible to provide an image file generating method that, for image data that has been input, inputs information that has been organized as items, so that it is possible to output user concerns that have been classified as inference results, as annotation related information corresponding to the image data, and generates integrated data, in which the annotation related information has been attached to the image data as metadata, as a block at the time of blockchain management.

With a blockchain, if there is change in data that is managed, content of that processing etc. is encrypted in block units, and by distributing to each database it is made possible to share that information with everyone (blockchain). Numerical characters for network identification, block size, header information etc. is collected together in this block. With a blockchain, when newly generating a block (that is, a collection of information that will be managed with a database), design is performed so that data of the block that was generated one before is partially included, and an entire processing history is connected in a single chain, which is why it is called a chain.

In other words, in order to have connections and relationships between blocks, part of a header of a prior block is encrypted and combined in the header of the new block. The header of this new block contains a "hash value" generated by encrypting the header of a previous block using a hash function, "processed record", and then an arbitrary number of a "nonce" (number used once: abbreviation for a numerical character that is used only one time). A hash value is for summarizing data, and it is difficult to falsify because it changes significantly with data change. Also, if restriction using special rules is provided in this hash value, it is necessary to determine additional data of the "nonce" in order for the hash value to satisfy this restriction.

An operation to find a nonce is called mining, and an operator looking for a nonce is called a miner, and if miners that are searching for a correct nonce can connect blocks and receive rewards, administrations that are combinations of economic incentives, such as cryptocurrency, become possible. By using this "nonce" and hash together, it is possible to further increase reliability of currencies. If the training data candidates that have been provided by the user are made into a block of a blockchain, it is possible to manage where those training data candidates are used, and it is also possible to perform mutual monitoring on this block so that it cannot be processed later.

In order to store transactions in a decentralized way, it is necessary to provide an incentive to participants who operate (ensuring data identity with other nodes that are distributively retained) distributed computers (nodes), and so cryptocurrency is used, but it is not necessary to assume cryptocurrency if other incentives can be offered, or if the mechanism for data identity guarantee can be simplified. For example, there may be mutual observation software for blockchain in a plurality of personal computers.

Also, in recent years, it has become common to use artificial intelligence, such as being able to determine various evaluation criteria in one go, and it goes without saying that there may be improvements such as unifying each branch etc. of the flowcharts shown in this specification, and this is within the scope of the present invention. Regarding this type of control, as long as it is possible for the user to input whether or not something is good or bad, it is possible to customize the embodiments shown in this application in a way that is suitable to users by learning the user's preferences.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A non-transitory computer-readable storing medium storing processor-executable instructions which, when executed by at least one processor, cause the at least one processor to perform an image file generating method comprising:
inputting image data that has been converted based on an image;
storing information representing passage of time in association with the image data;
inputting information, that has been selectively organized so that it is possible to output concerns that relate to the users input image as inference results, as annotation related information corresponding to the image data, wherein the annotation related information includes information as to whether what is being determined is timing or not;
attaching the annotation related information to the image data as metadata for a relationship between the image data and a user's concern to make a file as training data, wherein the training data includes results corresponding to passage of time in the annotation related information; and
correcting, responsive to a determination that change has occurred in an object of the image, the file by attaching the annotation related information, corresponding to results of the change, to the image data at a time before commencement of change stored in the memory.

2. The non-transitory computer-readable storing medium of claim 1, wherein the image file generating method further comprises:
generating integrated data, in which the annotation related information has been attached to the image data as metadata, as a block at the time of blockchain management.

* * * * *